United States Patent
Parks (10) Patent No.: US 11,767,407 B1
(45) Date of Patent: *Sep. 26, 2023

(54) HCFO-CONTAINING POLYURETHANE FOAM-FORMING COMPOSITIONS, RELATED FOAMS AND METHODS FOR THEIR PRODUCTION

(71) Applicant: Covestro LLC, Pittsburgh, PA (US)

(72) Inventor: Brandon Parks, McKees Rocks, PA (US)

(73) Assignee: Covestro LLC, Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/726,166

(22) Filed: Apr. 21, 2022

(51) Int. Cl.
| | |
|---|---|
| *C08J 9/12* | (2006.01) |
| *C08G 18/48* | (2006.01) |
| *C08G 18/76* | (2006.01) |
| *C08G 18/18* | (2006.01) |
| *C08G 18/22* | (2006.01) |
| *C08J 9/14* | (2006.01) |
| *C08G 18/16* | (2006.01) |

(52) U.S. Cl.
CPC ............ *C08J 9/127* (2013.01); *C08G 18/163* (2013.01); *C08G 18/1808* (2013.01); *C08G 18/225* (2013.01); *C08G 18/485* (2013.01); *C08G 18/4833* (2013.01); *C08G 18/7671* (2013.01); *C08J 9/125* (2013.01); *C08J 9/144* (2013.01); *C08J 2203/10* (2013.01); *C08J 2203/162* (2013.01); *C08J 2203/182* (2013.01); *C08J 2375/08* (2013.01)

(58) Field of Classification Search
CPC ... C08J 9/125; C08J 9/127; C08J 9/144; C08J 2203/10; C08J 2203/162; C08J 2203/182; C08J 2375/08; C08G 18/163; C08G 18/1808; C08G 18/225; C08G 18/4833; C08G 18/485; C08G 18/7671

See application file for complete search history.

(56) References Cited

U.S. PATENT DOCUMENTS

| | | | |
|---|---|---|---|
| 3,215,652 | A | 11/1965 | Kaplan |
| 5,648,019 | A | 7/1997 | White, III et al. |
| 10,106,641 | B2 | 10/2018 | Klesczewski et al. |
| 10,131,758 | B2 | 11/2018 | Younes et al. |
| 2007/0100009 | A1 | 5/2007 | Creazzo et al. |
| 2010/0210747 | A1 | 8/2010 | Loh et al. |
| 2010/0216904 | A1 | 8/2010 | Loh et al. |
| 2010/0280141 | A1 | 11/2010 | Loh et al. |
| 2011/0124756 | A1 | 5/2011 | Singh et al. |
| 2012/0121805 | A1* | 5/2012 | Fishback ............ C08G 18/6681 521/131 |
| 2012/0248371 | A1 | 10/2012 | Ross et al. |
| 2012/0313035 | A1 | 12/2012 | Williams et al. |
| 2014/0179814 | A1* | 6/2014 | Mooney ............ C08G 18/6677 521/131 |
| 2014/0213679 | A1 | 7/2014 | Albers et al. |
| 2014/0371338 | A1 | 12/2014 | Chen et al. |
| 2015/0051304 | A1 | 2/2015 | Shieh |
| 2015/0210818 | A1 | 7/2015 | Loh |
| 2016/0145374 | A1 | 5/2016 | Ishikawa |
| 2016/0152739 | A1 | 6/2016 | Eilbracht et al. |
| 2016/0200889 | A1 | 7/2016 | Parenti et al. |
| 2016/0200890 | A1 | 7/2016 | Taylor et al. |
| 2016/0251491 | A1 | 9/2016 | Okada et al. |
| 2017/0002165 | A1 | 1/2017 | Riccio et al. |
| 2017/0101501 | A1 | 4/2017 | Forkner et al. |
| 2018/0134861 | A1* | 5/2018 | Schilling ............ C08G 18/482 |
| 2019/0136005 | A1 | 5/2019 | Williams et al. |
| 2019/0322790 | A1 | 10/2019 | Rider et al. |
| 2019/0322791 | A1 | 10/2019 | Rider et al. |
| 2020/0283561 | A1 | 9/2020 | Parks |
| 2020/0283563 | A1 | 9/2020 | Parks et al. |
| 2020/0299453 | A1* | 9/2020 | Saad ................ C08G 18/7671 |
| 2020/0339733 | A1 | 10/2020 | Rider et al. |

FOREIGN PATENT DOCUMENTS

| | | |
|---|---|---|
| CN | 103709727 A | 9/2014 |
| CN | 104497251 A | 4/2015 |
| WO | 2007053670 A2 | 5/2007 |
| WO | 2009014965 A1 | 1/2009 |
| WO | 2012105657 A1 | 8/2012 |
| WO | 2013016632 A2 | 1/2013 |
| WO | 2014037476 A1 | 3/2014 |
| WO | 2014133986 A1 | 9/2014 |
| WO | 2014134087 A1 | 9/2014 |
| WO | 2015050139 A1 | 4/2015 |
| WO | 2017050887 A1 | 3/2017 |
| WO | 2020223059 A1 | 11/2020 |

OTHER PUBLICATIONS

U.S. Appl. No. 17/546,116, filed Dec. 9, 2021.

* cited by examiner

*Primary Examiner* — John M Cooney
(74) *Attorney, Agent, or Firm* — Donald R. Palladino (57) ABSTRACT

Polyurethane foam-forming compositions, methods of producing polyurethane foams, polyurethane foams produced from such compositions made by such methods, as well as isocyanate-reactive compositions. The polyurethane foam-forming compositions include a polyol blend, a blowing agent composition, and a polyisocyanate. The polyol blend includes an aromatic amine-initiated polyether polyol, a saccharide-initiated polyether polyol, and an aromatic polyester polyol and has a content of —$C_2H_4O$— units of 3 to 6% by weight, based on the total weight of the polyurethane foam-forming composition. The blowing agent composition includes a hydrochlorofluoroolefin and water.

23 Claims, 1 Drawing Sheet

HCFO-CONTAINING POLYURETHANE FOAM-FORMING COMPOSITIONS, RELATED FOAMS AND METHODS FOR THEIR PRODUCTION

FIELD

This specification pertains generally to hydrochlorofluoroolefin ("HCFO")—containing isocyanate-reactive compositions, polyurethane foam-forming compositions, and polyurethane foams produced therefrom.

BACKGROUND

Rigid polyurethane foams are used in numerous applications. They are produced by reacting a polyisocyanate and an isocyanate-reactive compound, usually a polyol, in the presence of a blowing agent. One use of such foams is as a thermal insulation medium in the construction of refrigerated storage devices, including refrigerated appliances and tractor trailers. The thermal insulating properties of closed-cell rigid foams are dependent upon a number of factors, including the average cell size and the thermal conductivity of the contents of the cells.

The thermal conductivity of the contents of the cells depends upon the blowing agent(s) used. Fluorocarbons have historically often been used because of their low thermal conductivity. However, fluorocarbons, including chlorofluorocarbons ("CFCs"), hydrofluorocarbons ("HFCs") and hydrochlorofluorocarbons ("HCFCs"), are greenhouse gases that have been phased out of use. Halogenated olefins, such as HCFOs, are environmentally friendlier alternatives for such fluorocarbons, but they can be costly. As a result, it is highly desirable to identify ways to significantly reduce the amount of HCFOs needed in a formulation for producing a rigid polyurethane foam, provided that the thermal efficiency of the resulting foam is not detrimentally impacted to any significant extent.

SUMMARY

In certain respects, this specification relates to polyurethane foam-forming compositions. These polyurethane foam-forming compositions comprise a polyol blend, a blowing agent composition, and a polyisocyanate. The polyol blend comprises: at least 30% by weight, based on total weight of the polyol blend, of an aromatic amine-initiated polyether polyol having a functionality of at least 2.5 and an OH number of 200 to 600 mg KOH/g; at least 30% by weight, based on total weight of the polyol blend, of a saccharide-initiated polyether polyol having a functionality of 4 to 6 and an OH number of 200 to 600 g/KOH gram; and 1 to 25% by weight, based on total weight of the polyol blend, of an aromatic polyester polyol having a functionality of 1.5 to 3 and an OH number of 150 to 410 mg KOH/g. The sum of the amount of the aromatic amine-initiated polyether polyol, the saccharide-initiated polyether polyol, and the aromatic polyester polyol is at least 90% by weight, based on the total weight of the polyol blend, and the polyol blend has a content of —$C_2H_4O$— units of 3 to 6% by weight, based on the total weight of the polyurethane foam-forming composition. The blowing agent composition comprises (1) a physical blowing agent and (2) water. The physical blowing agent comprises a hydrochlorofluoroolefin, wherein the hydrochlorofluoroolefin is present (i) in an amount of 5% to 15% by weight, based on total weight of the polyurethane foam-forming composition, and (ii) in an amount of at least 80% by weight, based on total weight of physical blowing agent in the blowing agent composition. The water is present in an amount of at least 1.70% by weight, based on the total weight of the polyurethane foam-forming composition except for the weight of the polyisocyanate. The polyisocyanate is present in an amount sufficient to provide an isocyanate index of 1.01 to less than 1.15.

In other respects, this specification relates to methods of producing a polyurethane foam. The methods comprise reacting, at an isocyanate index of 1.01 to less than 1.15, a polyurethane foam-forming composition comprising a polyol blend, a polyisocyanate, and a blowing agent composition. In these methods, the polyol blend comprises at least 30% by weight, based on total weight of the polyol blend, of an aromatic amine-initiated polyether polyol having a functionality of at least 2.5 and an OH number of 200 to 600 mg KOH/g; at least 30% by weight, based on total weight of the polyol blend, of a saccharide-initiated polyether polyol having a functionality of 4 to 6 and an OH number of 200 to 600 g/KOH gram; and 1 to 25% by weight, based on total weight of the polyol blend, of an aromatic polyester polyol having a functionality of 1.5 to 3 and an OH number of 150 to 410 mg KOH/g. The sum of the amount of the aromatic amine-initiated polyether polyol, the saccharide-initiated polyether polyol, and the aromatic polyester polyol is at least 90% by weight, based on the total weight of the polyol blend, and the polyol blend has a content of —$C_2H_4O$— units of 3 to 6% by weight, based on the total weight of the polyurethane foam-forming composition. The blowing agent composition comprises (1) a physical blowing agent and (2) water. The physical blowing agent comprises a hydrochlorofluoroolefin, wherein the hydrochlorofluoroolefin is present (i) in an amount of 5% to 15% by weight, based on total weight of the polyurethane foam-forming composition, and (ii) in an amount of at least 80% by weight, based on total weight of physical blowing agent in the blowing agent composition. The water is present in an amount of at least 1.70% by weight, based on the total weight of the polyurethane foam-forming composition except for the weight of the polyisocyanate.

In yet other respects, this specification relates to isocyanate-reactive compositions. These isocyanate-reactive compositions comprise a polyol blend and a physical blowing agent composition. The polyol blend comprises at least 30% by weight, based on total weight of the polyol blend, of an aromatic amine-initiated polyether polyol having a functionality of at least 2.5 and an OH number of 200 to 600 mg KOH/g; at least 30% by weight, based on total weight of the polyol blend, of a saccharide-initiated polyether polyol having a functionality of 4 to 6 and an OH number of 200 to 600 g/KOH gram; and 1 to 25% by weight, based on total weight of the polyol blend, of an aromatic polyester polyol having a functionality of 1.5 to 3 and an OH number of 150 to 410 mg KOH/g. The sum of the amount of the aromatic amine-initiated polyether polyol, the saccharide-initiated polyether polyol, and the aromatic polyester polyol is at least 90% by weight, based on the total weight of the polyol blend, and the polyol blend has a content of —$C_2H_4O$— units of 5 to 15% by weight, based on the total weight of the isocyanate-reactive composition. The blowing agent composition comprises (1) a physical blowing agent and (2) water. The physical blowing agent comprises a hydrochlorofluoroolefin, wherein the hydrochlorofluoroolefin is present (i) in an amount of 10% to 30% by weight, based on total weight of the isocyanate-reactive composition, and (ii) in an amount of at least 80% by weight, based on total weight of physical blowing agent in the blowing agent composition.

The water is present in an amount of at least 1.70% by weight, based on the total weight of the isocyanate-reactive composition.

This specification is also directed to rigid polyurethane foams produced from such foam-forming compositions and by such methods, as well as to composite articles comprising such rigid foams and panel insulation that includes such rigid foams.

DETAILED DESCRIPTION

Various implementations are described and illustrated in this specification to provide an overall understanding of the structure, function, properties, and use of the disclosed inventions. It is understood that the various implementations described and illustrated in this specification are non-limiting and non-exhaustive. Thus, the invention is not limited by the description of the various non-limiting and non-exhaustive implementations disclosed in this specification. The features and characteristics described in connection with various implementations may be combined with the features and characteristics of other implementations. Such modifications and variations are intended to be included within the scope of this specification. As such, the claims may be amended to recite any features or characteristics expressly or inherently described in, or otherwise expressly or inherently supported by, this specification. Further, Applicant(s) reserve the right to amend the claims to affirmatively disclaim features or characteristics that may be present in the prior art. Therefore, any such amendments comply with the requirements of 35 U.S.C. § 112 and 35 U.S.C. § 132(a). The various implementations disclosed and described in this specification can comprise, consist of, or consist essentially of the features and characteristics as variously described herein.

Any patent, publication, or other disclosure material identified herein is incorporated by reference into this specification in its entirety unless otherwise indicated, but only to the extent that the incorporated material does not conflict with existing definitions, statements, or other disclosure material expressly set forth in this specification. As such, and to the extent necessary, the express disclosure as set forth in this specification supersedes any conflicting material incorporated by reference herein. Any material, or portion thereof, that is said to be incorporated by reference into this specification, but which conflicts with existing definitions, statements, or other disclosure material set forth herein, is only incorporated to the extent that no conflict arises between that incorporated material and the existing disclosure material. Applicant(s) reserves the right to amend this specification to expressly recite any subject matter, or portion thereof, incorporated by reference herein.

In this specification, other than where otherwise indicated, all numerical parameters are to be understood as being prefaced and modified in all instances by the term "about", in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described in the present description should at least be construed in light of the number of reported significant digits and by applying ordinary rounding techniques.

Also, any numerical range recited in this specification is intended to include all sub-ranges of the same numerical precision subsumed within the recited range. For example, a range of "1.0 to 10.0" is intended to include all sub-ranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited in this specification is intended to include all lower numerical limitations subsumed therein and any minimum numerical limitation recited in this specification is intended to include all higher numerical limitations subsumed therein. Accordingly, Applicant(s) reserves the right to amend this specification, including the claims, to expressly recite any sub-range subsumed within the ranges expressly recited herein. All such ranges are intended to be inherently described in this specification such that amending to expressly recite any such sub-ranges would comply with the requirements of 35 U.S.C. § 112 and 35 U.S.C. § 132(a).

The grammatical articles "one", "a", "an", and "the", as used in this specification, are intended to include "at least one" or "one or more", unless otherwise indicated. Thus, the articles are used in this specification to refer to one or more than one (i.e., to "at least one") of the grammatical objects of the article. By way of example, "a component" means one or more components, and thus, possibly, more than one component is contemplated and may be employed or used in an implementation of the described implementations. Further, the use of a singular noun includes the plural, and the use of a plural noun includes the singular, unless the context of the usage requires otherwise.

As used herein, the term "functionality" refers to the average number of reactive hydroxyl groups, —OH, present per molecule of the —OH functional material that is being described. In the production of polyurethane foams, the hydroxyl groups react with isocyanate groups, —NCO, that are attached to the isocyanate compound. The term "hydroxyl number" refers to the number of reactive hydroxyl groups available for reaction and is expressed as the number of milligrams of potassium hydroxide equivalent to the hydroxyl content of one gram of the polyol (ASTM D4274-16). The term "equivalent weight" refers to the weight of a compound divided by its valence. For a polyol, the equivalent weight is the weight of the polyol that will combine with an isocyanate group and may be calculated by dividing the molecular weight of the polyol by its functionality. The equivalent weight of a polyol may also be calculated by dividing 56,100 by the hydroxyl number of the polyol–Equivalent Weight (g/eq)=(56.1×1000)/OH number.

The polyol blends of this specification have a content of —C$_2$H$_4$O— units within a specified range. As used in this context, "a content of —C$_2$H$_4$O— units" refers to the calculated weight of —C$_2$H$_4$O— units present in a polyol that are formed during production of the polyol itself (as opposed to —C$_2$H$_4$O— units that may already be present in a reactant used to prepare the polyol). In the case of a polyether polyol that is an alkoxylation reaction product of an H-functional starter and an alkylene oxide, for example, —C$_2$H$_4$O— units can result from use of ethylene oxide as an alkylene oxide and/or use of an H-functional starter containing a —C$_2$H$_4$Z— group in which Z represents a Zerewitinoff-active hydrogen atom (sometimes also referred to merely as "active hydrogen"), such as can be the case where Z represents a hydrogen bonded to N, O or S. In the case of a polyester polyol that is a reaction product of a carboxylic acid and/or anhydride thereof with a hydroxyl-containing material, —$C_2H_4Z$— units may result, for example, from use of diethylene glycol as a hydroxyl-containing material. Thus, when it is stated herein that a polyol blend has a content of —$C_2H_4O$— units of 3 to 6% by weight, based on total weight of the polyurethane foam-forming composition, it means that 3 to 6% by weight of the polyurethane foam-forming composition, based on the total weight of the polyurethane foam-forming composition, is —$C_2H_4O$— units formed during production of the polyol(s) that are used, as calculated based on the weight of materials used to make the polyols.

As indicated, certain implementations of the present specification relate to isocyanate-reactive compositions useful in the production of rigid foams. A rigid foam is characterized as having a ratio of compressive strength to tensile strength of at least 0.5:1, elongation of less than 10%, as well as a low recovery rate from distortion and a low elastic limit, as described in in "Polyurethanes: Chemistry and Technology, Part II Technology," J. H. Saunders & K. C. Frisch, Interscience Publishers, 1964, page 239.

The rigid foams of this specification are the reaction product of a polyurethane-foam forming composition that includes a polyisocyanate. As used herein, the term "polyisocyanate" encompasses diisocyanates, as well as polyisocyanates of greater functionality than 2.0.

Any of the known organic isocyanates, modified isocyanates or isocyanate-terminated prepolymers made from any of the known organic isocyanates may be used. Suitable organic isocyanates include aromatic, aliphatic, and cycloaliphatic polyisocyanates and combinations thereof. Useful isocyanates include: diisocyanates such as m-phenylene diisocyanate, p-phenylene diisocyanate, 2,4-toluene diisocyanate, 2,6-toluene diisocyanate, 1,6-hexamethylene diisocyanate, 1,4-hexamethylene diisocyanate, 1,3-cyclohexane diisocyanate, 1,4-cyclo-hexane diisocyanate, isomers of hexahydro-toluene diisocyanate, isophorone diisocyanate, dicyclo-hexylmethane diisocyanates, 1,5-naphthylene diisocyanate, 4,4'-diphenylmethane diisocyanate, 2,4'-diphenylmethane diisocyanate, 4,4'-biphenylene diisocyanate, 3,3'-dimethoxy-4,4'-biphenylene diisocyanate and 3,3'-dimethyldiphenyl-propane-4,4'-diisocyanate; triisocyanates such as 2,4,6-toluene triisocyanate; and polyisocyanates such as 4,4'-dimethyl-diphenylmethane-2,2',5,5'-tetraisocyanate and the polymethylene polyphenyl-polyisocyanates.

Undistilled or crude polyisocyanates may also be used. The crude toluene diisocyanate obtained by phosgenating a mixture of toluene diamines and the crude diphenylmethane diisocyanate obtained by phosgenating crude diphenylmethanediamine (polymeric MDI) are examples of suitable crude polyisocyanates. Suitable undistilled or crude polyisocyanates are disclosed in U.S. Pat. No. 3,215,652.

Modified isocyanates are obtained by chemical reaction of diisocyanates and/or polyisocyanates. Useful modified isocyanates include, but are not limited to, those containing ester groups, urea groups, biuret groups, allophanate groups, carbodiimide groups, isocyanurate groups, uretdione groups and/or urethane groups. Examples of modified isocyanates include prepolymers containing NCO groups and having an NCO content of from 25 to 35 weight percent, such as from 29 to 34 weight percent, such as those based on polyether polyols or polyester polyols and diphenylmethane diisocyanate.

In certain implementations, the polyisocyanate comprises a methylene-bridged polyphenyl polyisocyanate and/or a prepolymer of methylene-bridged polyphenyl polyisocyanates having an average functionality of from 1.8 to 3.5, such as from 2.0 to 3.1, isocyanate moieties per molecule and an NCO content of from 25 to 32 weight percent, due to their ability to cross-link the polyurethane.

The isocyanate-reactive compositions described in this specification comprise a polyol blend. More specifically, the polyol blend comprises an aromatic amine-initiated polyether polyol. As used herein, "aromatic amine-initiated polyether polyol" refers to a polyether polyol that is the reaction product of an H-functional starter comprising an aromatic amine, such as toluenediamine ("TDA"), with alkylene oxide.

In certain implementations, aromatic amine employed has an amine functionality of at least 1, such as 1 to 3 or 1 to 2. Specific examples of suitable aromatic amines which can be used include crude TDA obtained by the nitration of toluene followed by reduction; 2,3-TDA, 3,4-TDA, 2,4-TDA, 2,6-TDA or mixtures thereof, aniline; 4,4'-methylene dianiline; methylene-bridged polyphenyl polyamines composed of isomers of methylene dianilines and triamines or polyamines of higher molecular weight prepared by reacting aniline with formaldehyde by methods known in the art. In some implementations, a mixture composed of 2,3-TDA and 3,4-TDA (commonly referred to as "o-TDA") is used.

In addition to the aromatic amine, other H-functional starters may also be used to prepare the aromatic amine-initiated polyether polyol. These other H-functional starters include, for example, water, propylene glycol, glycerin, ethylene glycol, ethanol amines, diethylene glycol, or a mixture of any two or more thereof. As will be appreciated, it is possible to use a wide variety of individual starters in combination with one another. In some implementations, however, aromatic amine is the predominant or essentially sole H-functional starter used to produce the aromatic amine-initiated polyether polyol. This means that, in these implementations, aromatic amine is present in an amount of more than 50% by weight, such as at least 80% by weight, at least 90% by weight, or even 100% by weight, based on the total weight of H-functional starter used to produce the aromatic amine-initiated polyether polyol.

A variety of alkylene oxides may be used to produce the aromatic amine-initiated polyether polyol, such as ethylene oxide, propylene oxide, butylene oxide, amylene oxide and mixtures thereof. The alkylene oxides may be added individually, sequentially one after the other to form blocks or in a mixture to form a heteric polyether. The aromatic amine-initiated polyether polyols may have primary or secondary hydroxyl end groups. In some implementations, propylene oxide is the primary or essentially sole alkylene oxide used to prepare the aromatic amine-initiated polyether polyol. This means that, in these implementations, propylene oxide is used in an amount of more than 50% by weight, such as at least 80% by weight, at least 90% by weight, or even 100% by weight, based on the total weight of alkylene oxide used to prepare the aromatic amine-initiated polyether polyol. In some implementations, ethylene oxide is employed in a relatively small amount. In these implementations, ethylene oxide is used in an amount of no more than 10% by weight, no more than 5% by weight, no more than 1% by weight, or, in some cases, 0% by weight, based on the total weight of alkylene oxide used to prepare the aromatic amine-initiated polyether polyol.

As indicated earlier, the aromatic amine-initiated polyether polyol has an OH number of 200 to 600 mg KOH/g and a functionality of at least 2.5. In some implementations, the aromatic amine-initiated polyether polyol has an OH number of 300 to 500 mg KOH/g, such as 380 to 420 mg KOH/g and an average functionality of 3.5 to 4.5, 3.8 to 4.2 or 4.0. In addition, the aromatic amine-initiated polyether polyol, in some implementations, has a content of —$C_2H_4O$— units of less than 10% by weight, such as less than 5% by weight, less than 2% by weight, or, in some cases, 0% by weight, based on total weight of the aromatic amine-initiated polyether polyol.

The foregoing aromatic amine-initiated polyether polyol is present in an amount of at least 30% by weight, based on the total weight of polyol that is present. More specifically, in some implementations, the foregoing aromatic amine-initiated polyol is present in an amount of 30 to 80% by weight, such as 30 to 60% by weight, or, in some cases, 40 to 60% by weight or 40 to 50% by weight, based on the total weight of the polyol blend.

The polyol blend also includes a saccharide-initiated polyether polyol. As used herein, "saccharide-initiated polyether polyol" refers to a polyether polyol that is the reaction product of an H-functional starter comprising saccharide, such as sucrose, with alkylene oxide. Examples of suitable alkylene oxides include ethylene oxide, propylene oxide, butylene oxide, styrene oxide, epichlorohydrin, or a mixture of any two or more thereof. Some examples of suitable saccharide initiators are sucrose, sorbitol, maltitol, etc. as well as other mono-saccharides, di-saccharides, tri-saccharides and polysaccharides. Other initiator compounds are often used in combination with the saccharide initiator to prepare the saccharide-initiated polyether polyol. Saccharides can be co-initiated with for example, compounds such as water, propylene glycol, glycerin, ethylene glycol, ethanol amines, diethylene glycol, or a mixture of any two or more thereof. As will be appreciated, it is possible to use a wide variety of individual initiator compounds in combination with saccharide initiator.

In some implementations, saccharide is the predominant H-functional starter used to produce the saccharide-initiated polyether polyol. This means that, in these implementations, saccharide is present in an amount of more than 50% by weight, such as at least 70% by weight or at least 80% by weight, based on the total weight of H-functional starter used to produce the saccharide-initiated polyether polyol.

In some implementations, propylene oxide is the primary or essentially sole alkylene oxide used to prepare the saccharide-initiated polyether polyol. This means that, in these implementations, propylene oxide is used in an amount of more than 50% by weight, such as at least 60% by weight, or at least 70% by weight, based on the total weight of alkylene oxide used to prepare the saccharide-initiated polyether polyol. In some implementations, ethylene oxide is employed in a relatively small amount. Thus, in these implementations, ethylene oxide is present in an amount of no more than 50% by weight, such as no more than 40% by weight, or, in some cases, no more than 30% by weight, based on the total weight of alkylene oxide used to prepare that saccharide-initiated polyether polyol.

In some implementations, the saccharide-initiated polyether polyol has an OH number of from 200 to 600 mg KOH/g, such as 300 to 550 mg KOH/g, such as 380 to 500 mg KOH/g, or, in some cases, 450 to 500 mg KOH/g, and a functionality of 4 to 6, such as 5 to 6, 5.2 to 5.8, or 5.2 to 5.6. In addition, in some implementations, the saccharide-initiated polyether polyol has a content of —$C_2H_4O$— units of less than 50% by weight, such as less than 40% by weight, or no more than 30% by weight, based on total weight of the saccharide-initiated polyether polyol.

The saccharide-initiated polyether polyol is present in an amount of at least 30% by weight, based on the total weight of polyol that is present. More specifically, in some implementations, the saccharide-initiated polyol is present in an amount of 30 to 60% by weight, such as 30 to 50% by weight, or, in some cases, 35 to 45% by weight, based on the total weight of the polyol blend.

In some implementations, the polyol blend comprises an aromatic polyester polyol. Suitable aromatic polyester polyols include, for example, the reaction product of an aromatic diacid or anhydride with a suitable glycol or triol. For example, polyester polyols can be the reaction product of a glycol and/or triol, such as ethylene glycol, propylene glycol, butylene glycol, 1,3- butanediol, neopentyl glycol, diethylene glycol, dipropylene glycol, triethylene glycol, tripropylene glycol, glycerol, trimethylolethane, trimethyolpropane, pentanediol, hexanediol, heptanediol, 1,3- and 1,4- dimethylol cyclohexane, or a mixture of any two or more thereof with an aromatic diacid or aromatic anhydride, such as, for example, phthalic acid, isophthalic acid, terephthalic acid, phthalic anhydride, or a mixture of any two or more thereof. Some of examples of the suitable aromatic polyester polyols include those compounds which are available from Stepan Chemical under the Stepanpol trade name such as, for example, Stepanpol® PS 3024 and Stepanpol PS 2502A or from Invista under the Terate trade name, such as Terate® HT-5100 and HT-5500, or from Coim under the Isoexter trade name such as Isoexter® TB-265.

In certain implementations, the aromatic polyester polyol has an OH number of 150 to 410 mg KOH/g, such as 150 to 360 mg KOH/g, such as 200 to 335 mg KOH/g, or, in some cases, 200 to 250 mg KOH/g, and a functionality of 1.5 to 3, such as 1.9 to 2.5. In some implementations, the aromatic polyester polyol has a content of —$C_2H_4O$— units of less than 50% by weight, based on total weight of the aromatic polyester polyol.

The aromatic polyester polyol is utilized in an amount of 1 to 25%, based on total weight of polyol that is present. In some implementations, the aromatic polyester polyol is present in an amount of 5 to 25% by weight, 5 to 20% by weight, or 10 to 20% by weight, based upon the total weight of the polyol blend.

In certain implementations, the aromatic amine-initiated polyether polyol and the saccharide-initiated polyether polyol are present in a weight ratio of at least 0.8:1, such as 1:1 to 5:1, 1:1 to 2:1 or, in some cases, 1:1 to 1.5:1. In certain implementations, the aromatic amine-initiated polyether polyol and the aromatic polyester polyol are present in a weight ratio of at least 1:1, such as 1:1 to 5:1, 2:1 to 4:1 or 2.5:1 to 3.5:1. In certain implementations, the saccharide-initiated polyether polyol and the aromatic polyester polyol are present in a weight ratio of at least 1:1, such as 1:1 to 5:1, 2:1 to 4:1 or, in some cases, 2.5:1 to 3.0:1.

If desired, the polyol blend may include additional compounds that contain isocyanate-reactive groups, such as chain extenders and/or crosslinking agents, and higher molecular weight polyether polyols and polyester polyols not described above. Chain extenders and/or crosslinking agents include, for example, ethylene glycol, propylene glycol, butylene glycol, glycerol, diethylene glycol, dipropylene glycol, dibutylene glycol, trimethylolpropane, pentaerythritol, ethylene diamine, and diethyltoluenediamine.

In certain implementations, the polyol blend has a weighted average functionality of from 3 to 5, such as 3.5 to 4.5 or 3.8 to 4.2, and/or a weighted average hydroxyl number of from 300 to 500 mg KOH/g, such as 350 to 450 mg KOH/g. In certain embodiments, the polyol blend is present in the polyurethane foam-forming composition in an amount of at least 50% by weight, such as 50 to 90% by weight or 60 to 80% by weight, based on the total weight of the polyurethane foam-forming composition except for the weight of the polyisocyanate.

As earlier indicated, one aspect of the inventions of this specification is that the polyol blend has a content of —$C_2H_4O$— units of 3 to 6% by weight, based on total weight of the polyurethane foam-forming composition. In some implementation, the polyol blend has a content of —$C_2H_4O$— units of 4 to 6% by weight or 5 to 6% by weight, based on total weight of the polyurethane foam-forming composition.

In some implementations, the sum of the amount of the aromatic amine-initiated polyether polyol, the saccharide-initiated polyether polyol, and the aromatic polyester polyol is at least 90% by weight, such as at least 95% by weight, at least 98% by weight, or, in some cases, 100% by weight, based on the total weight of the polyol blend.

Further, in some implementations, the polyol blend does not include any filled polyol. As will be appreciated, a "filled polyol" is a dispersion of polymer particles in a base polyol. Examples of filled polyols, any or all of which are excluded from use in the some implementations of the polyol blends employed in the inventions disclosed herein, are "polymer polyols", in which the polymer particles comprise a polymer comprising the free radical polymerization reaction product of an ethylenically unsaturated compound, "PIPA polyols", in which the polymer particles comprise a polyisocyanate polyaddition polymer comprising the reaction product of a polymerizable composition comprising an isocyanate and an alkanolamine, and "PHD polyols" in which the polymer particles comprise a polyhydrazodiconamide comprising the reaction product of a reaction mixture comprising an isocyanate and a diamine and/or a hydrazine.

As indicated, the polyurethane foam-forming compositions of this specification further comprises a physical blowing agent composition comprising a HCFO. Suitable HCFOs include 1-chloro-3,3,3-trifluoropropene (HCFO-1233zd, E and/or Z isomers), 2-chloro-3,3,3-trifluoropropene (HCFO-1233xf), HCF01223, 1,2-dichloro-1,2-difluoroethene (E and/or Z isomers), 3,3-dichloro-3-fluoropropene, 2-chloro-1,1,1,4,4,4-hexafluorobutene-2 (E and/or Z isomers), 2-chloro-1,1,1,3,4,4,4-heptafluorobutene-2 (E and/or Z isomers). In some implementations, the boiling point, at atmospheric pressure, of the HCFO is at least −25° C., at least −20° C., or, in some cases, at least −19° C., and 40° C. or less, such as 35° C. or less, or, in some cases 33° C. or less. The HCFO may have a boiling point, at atmospheric pressure, of, for example, −25° C. to 40° C., or −20° C. to 35° C., or −19° C. to 33° C.

In some implementations, the HCFO is utilized in an amount of at least 10% by weight, such as 10 to 30% by weight or 10 to 20% by weight or 14 to 18% by weight, based on the total weight of the polyurethane foam-forming composition except for the weight of the polyisocyanate.

If desired, the isocyanate-reactive composition may include one or more other physical blowing agents, such as other halogenated blowing agents, such as CFCs, HCFCs, HFCs, other HFOs (aside from HCFO) and/or hydrocarbon blowing agents, such as butane, n-pentane, cyclopentane, hexane, and/or isopentane (i.e., 2-methylbutane). In other embodiments, however, the isocyanate-reactive composition is substantially or, in some cases, completely free, of such other physical blowing agents. Therefore, in some implementations, the HCFO is present in amount of at least 80% by weight, such as at least 90% by weight, at least 95% by weight, at least 99% by weight or, in some cases 100% by weight, based on the total weight of the physical blowing agent in the blowing agent composition.

The polyurethane foam-forming compositions of this specification also include water, which acts as a carbon dioxide generating chemical blowing agent. Specifically, water is utilized in an amount of at least 1.70% by weight, such as 1.70 to 5.0% by weight, such as 2.0 to 4.0% by weight, or 2.0 to 3.0% by weight, or 2.1 to 2.5% by weight, based on the total weight of the polyurethane foam-forming composition except for the weight of the polyisocyanate.

In certain implementations, the physical blowing agent composition and the water are present in a relative ratio, by weight, of at least 5:1, such as 5:1 to 50:1, 5:1 to 20:1 or, in some cases, 5:1 to 9:1 or 7:1 to 8:1.

The polyurethane foam-forming composition also typically comprises a surfactant. Suitable surfactants include, for example, organosilicon compounds, such as polysiloxane-polyalkyene-block copolymers, such as a polyether-modified polysiloxane. Other possible surfactants include polyethylene glycol ethers of long chain alcohols, tertiary amine or alkanolamine salts of long chain alkyl acid sulfate esters, alkylsulfonic esters, or alkylarylsulfonic acids. Such surfactants are employed in amounts sufficient to stabilize the foaming reaction mixture against collapse and the formation of large and uneven cells. In some implementations, surfactant is utilized in an amount of 0.2 to 5.0% by weight, such as 1 to 3% by weight, based on the total weight of the polyurethane foam-forming composition except for the weight of the polyisocyanate.

The polyurethane foam-forming compositions of this specification also typically comprise a catalyst, such as a tertiary amine, tertiary phosphine, a metal chelate, an acid metal salt, a strong base, a metal alcoholate and/or phenolate, a metal salt of an organic acid, or a combination thereof. In some implementations, the catalyst comprises an organotin catalyst and/or tertiary amine catalyst. For example, in some cases, a combination of at least one "blowing" catalyst, which strongly promotes the reaction of an isocyanate group with a water molecule to form carbon dioxide, and either at least one "gelling" catalyst, which strongly promotes the reaction of an alcohol group with an isocyanate to form the urethane, or at least one trimerization catalyst, may be used.

Specific examples of suitable tertiary amine catalysts include: pentamethyldiethylenetriamine, N,N-dimethylcyclohexylamine, N,N',N''-tris(3-dimethylaminopropyl-)hexahydrotriazine, tetramethylethylenediamine, tetraethylene diamine, benzyldimethylamine or a combination thereof. In certain embodiments, the tertiary amine catalyst includes pentamethyldiethylenetriamine, N,N',N''-dimethylaminopropyl-hexahydrotriazine, N,N-dimethylcyclohexylamine, or a combination thereof. Specific examples of suitable organometallic catalysts include dibutyltin dilaurate, dibutyltin diacetate, stannous octoate, potassium octoate, potassium acetate, potassium 2-ethylhexanoate, or a combination thereof. In some implementations, catalyst is present in an amount of 0.01 to 3.0% by weight or 0.3 to 2.5% by weight, based on the total weight of the polyurethane foam-forming composition except for the weight of the polyisocyanate.

Additional materials which may optionally be included in the foam-forming compositions of the present invention include pigments, colorants, fillers, antioxidants, flame retardants, and stabilizers. Exemplary flame retardants useful in the foam-forming composition of the present invention include, but are not limited to, reactive bromine-based compounds known to be used in polyurethane chemistry and chlorinated phosphate esters, including but not limited to, tri(2-chloroethyl)phosphate (TECP), tri(1,3-dichloro-2-propyl)phosphate, tri(1-chloro-2-propyl)phosphate (TCPP) and dimethyl propyl phosphate (DMPP).

This specification is also directed to processes for producing rigid polyurethane foams. In such processes, a polyisocyanate is reacted with an isocyanate-reactive composition comprising the polyol blend. In some implementations, the isocyanate functional component and the polyol blend are mixed at an isocyanate index of from 1.01 to less than 1.15, such as 1.05 to less than 1.15 or 1.05 to 1.10.

The polyol blend is reacted with a polyisocyanate in the presence of the blowing agent composition, the catalyst composition, a surfactant and any other optional ingredients. The rigid foams may be prepared by blending all of the polyurethane foam-forming composition components, except for the polyisocyanate, together in a phase stable mixture, and then mixing this mixture in the proper ratio with the polyisocyanate. Alternatively, one or more of the components, such as the surfactant, may be combined with the polyisocyanate prior to mixing it with the polyol blend. Other possible implementations would include adding one or more of the components as a separate stream, together with the polyol blend and polyisocyanate. As used herein, the term phase stable means that the composition does not visibly separate when stored for 7 days at about 70° F. (or 21° C.).

Many foam machines are designed to condition and mix only two components in the proper ratio. For use of these machines, a premix of all the components except the polyisocyanate can be advantageously employed. According to the two-component method (component A: polyisocyanate; and component B: isocyanate-reactive composition which typically includes the polyol blend, blowing agent, water, catalyst and surfactant), the components may be mixed in the proper ratio at a temperature of 5 to 50° C., such as 15 to 35° C., injected or poured into a mold having the temperature controlled to within a range of from 20 to 70° C., such as 35 to 60° C. The mixture then expands to fill the cavity with the rigid polyurethane foam. This simplifies the metering and mixing of the reacting components which form the foam-forming mixture but requires that the isocyanate reactive composition be phase stable.

Alternatively, the rigid polyurethane foams may also be prepared by the so-called "quasi prepolymer" method. In this method, a portion of the polyol component is reacted in the absence of the urethane-forming catalysts with the polyisocyanate component in proportion so as to provide from 10 percent to 35 percent of free isocyanate groups in the reaction product based on the prepolymer. To prepare foam, the remaining portion of the polyol is added, and the components are allowed to react together in the presence of the blowing agent and other appropriate additives such as the catalysts, and surfactants. Other additives may be added to either the isocyanate prepolymer or remaining polyol or both prior to the mixing of the components, whereby at the end of the reaction, rigid foam is provided.

Furthermore, the rigid foam can be prepared in a batch or continuous process by the one-shot or quasi-prepolymer methods using any well-known foaming apparatus. The rigid foam may be produced in the form of slab stock, moldings, cavity fillings, sprayed foam, frothed foam or laminates with other materials such as hardboard, plasterboard, plastics, paper or metal as facer substrates.

For closed-cell insulating foams, the object is to retain the blowing agent in the cells to maintain a low thermal conductivity of the insulating material, i.e., the rigid foam. Thus, high closed-cell content in the foam is desirable. In some implementations, the rigid foams produced according to implementations of this specification have a closed-cell content of more than 80 percent, more than 85 percent, or more than 88 percent, as measured according to ASTM D6226-15. Furthermore, the thermal conductivity of foams produced according to various implementations of the present specification indicates that the foams have acceptable insulating properties, i.e., the foams have a thermal conductivity measured at 35° F. (2° C.) of less than 0.126 BTU-in/h-ft$^2$-° F. and measured at 75° F. (24° C.) of less than 0.140 BTU-in/h-ft$^2$-° F. for foam from the core of 2-inch thick panels, as measured according to ASTM C518-15.

This specification also relates to the use of the rigid foams described herein for thermal insulation. That is, the rigid foams of the present specification may find use as an insulating material in refrigeration apparatuses. These rigid foams can be used, for example, as an intermediate layer in composite elements or for filling hollow spaces of refrigerators, freezers, or refrigerated trailers. These foams may also find use in the construction industry or for thermal insulation of long-distance heating pipes and containers.

As such, the present invention also provides a composite article comprising rigid foam as disclosed herein sandwiched between one or more facer substrates. In certain implementations, the facer substrate may be plastic (such a polypropylene resin reinforced with continuous bi-directional glass fibers or a fiberglass reinforced polyester copolymer), paper, wood, or metal. For example, in certain implementations, the composite article may be a refrigeration apparatus such as a refrigerator, freezer, or cooler with an exterior metal shell and interior plastic liner. In certain implementations, the refrigeration apparatus may be a trailer, and the composite article may include the foams produced according to the present invention in sandwich composites for trailer floors or sidewalls.

It has been found, surprisingly, that the particular polyurethane foam-forming compositions described herein are capable, when formulated with appropriate additives (surfactants, catalysts, etc.), of producing rigid polyurethane foams with similar thermal insulation properties (as determined by K-factor measurements) while utilizing a significantly reduced amount (nearly 20% reduction) of costly HCFO physical blowing agent, while still retaining other important foam properties and processing characteristics, such as dimensional stability, compressive strength, flow, reactivity and de-mold characteristics.

Various aspects of the subject matter described herein are set out in the following numbered clauses:

Clause 1. A polyurethane foam-forming composition comprising: (a) a polyol blend comprising: (1) at least 30% by weight, based on total weight of the polyol blend, of an aromatic amine-initiated polyether polyol having a functionality of at least 2.5 and an OH number of 200 to 600 mg KOH/g; (2) at least 30% by weight, based on total weight of the polyol blend, of a saccharide-initiated polyether polyol having a functionality of 4 to 6 and an OH number of 200 to 600 g/KOH gram; and (3) 1 to 25% by weight, based on total weight of the polyol blend, of an aromatic polyester polyol having a functionality of 1.5 to 3 and an OH number of 150 to 410 mg KOH/g, wherein the sum of the amount of the aromatic amine-initiated polyether polyol, the saccharide-initiated polyether polyol, and the aromatic polyester polyol is at least 90% by weight, based on the total weight of the polyol blend, and the polyol blend has a content of —$C_2H_4O$— units of 3 to 6% by weight, based on the total weight of the polyurethane foam-forming composition; (b) a polyisocyanate present in an amount sufficient to provide an isocyanate index of 1.01 to less than 1.15; and (c) a blowing agent composition comprising: (1) a physical blowing agent and (2) water present in an amount of at least 1.70% by weight, based on the total weight of the polyurethane foam-forming composition except for the weight of the polyisocyanate, wherein (i) the physical blowing agent comprises a hydrochlorofluoroolefin that is present in an amount of 5% to 15% by weight, based on total weight of the polyurethane foam-forming composition and in an amount of at least 80% by weight, based on total weight of physical blowing agent in the blowing agent composition, and (ii) the physical blowing agent composition and the water are present in a relative ratio, by weight, of 5:1 to 50:1.

Clause 2. The polyurethane foam-forming composition of clause 1, wherein the aromatic amine used to produce the aromatic amine-initiated polyether polyol has an amine functionality of at least 1, 1 to 3, or 1 to 2.

Clause 3. The polyurethane foam-forming composition of clause 1 or clause 2, wherein the aromatic amine used to produce the aromatic amine-initiated polyether polyol comprises 2,3-TDA, 3,4-TDA, 2,4-TDA, 2,6-TDA or a mixture thereof, such as a mixture comprising 2,3-TDA and 3,4-TDA.

Clause 4. The polyurethane foam-forming composition of any one of clause 1 to clause 3, wherein aromatic amine is present in an amount of more than 50% by weight, at least 80% by weight, at least 90% by weight, or 100% by weight, based on the total weight of H-functional starter used to produce the aromatic amine-initiated polyether polyol.

Clause 5. The polyurethane foam-forming composition of any one of clause 1 to clause 4, wherein propylene oxide is used in an amount of more than 50% by weight, at least 80% by weight, at least 90% by weight, or 100% by weight, based on total weight of alkylene oxide used to prepare the aromatic amine-initiated polyether polyol.

Clause 6. The polyurethane foam-forming composition of clause 5, wherein ethylene oxide is used in an amount of no more than 10% by weight, no more than 5% by weight, no more than 1% by weight, or 0% by weight, based on the total weight of alkylene oxide used to prepare the aromatic amine-initiated polyether polyol.

Clause 7. The polyurethane foam-forming composition of any one of clause 1 to clause 6, wherein the aromatic amine-initiated polyether polyol has an OH number of 300 to 500 mg KOH/g or 380 to 420 mg KOH/g and/or an average functionality of 3.5 to 4.5, 3.8 to 4.2 or 4.0.

Clause 8. The polyurethane foam-forming composition of any one of clause 1 to clause 7, wherein the aromatic amine-initiated polyether polyol has a content of —$C_2H_4O$— units of less than 10% by weight, less than 5% by weight, less than 2% by weight, or 0% by weight, based on total weight of the aromatic amine-initiated polyether polyol.

Clause 9. The polyurethane foam-forming composition of any one of clause 1 to clause 8, wherein the aromatic amine-initiated polyether polyol is present in an amount of 30 to 80% by weight, 30 to 60% by weight, 40 to 60% by weight or 40 to 50% by weight, based on the total weight of the polyol blend.

Clause 10. The polyurethane foam-forming composition of any one of clause 1 to clause 9, wherein saccharide is present in an amount of more than 50% by weight, at least 70% by weight or at least 80% by weight, based on the total weight of H-functional starter used to produce the saccharide-initiated polyether polyol.

Clause 11. The polyurethane foam-forming composition of any one of clause 1 to clause 10, wherein propylene oxide is present in an amount of more than 50% by weight, at least 60% by weight, or at least 70% by weight, based on the total weight of alkylene oxide used to prepare the saccharide-initiated polyether polyol.

Clause 12. The polyurethane foam-forming composition of clause 11, wherein ethylene oxide is present in an amount of no more than 50% by weight, no more than 40% by weight, or no more than 30% by weight, based on the total weight of alkylene oxide used to prepare that saccharide-initiated polyether polyol.

Clause 13. The polyurethane foam-forming composition of any one of clause 1 to clause 12, wherein the saccharide-initiated polyether polyol has an OH number of 200 to 600 mg KOH/g, 300 to 550 mg KOH/g, 380 to 500 mg KOH/g, or 450 to 500 mg KOH/g, and/or a functionality of 4 to 6, 5 to 6, 5.2 to 5.8, or 5.2 to 5.6.

Clause 14. The polyurethane foam-forming composition of any one of clause 1 to clause 13, wherein the saccharide-initiated polyether polyol has a content of —$C_2H_4O$— units of less than 50% by weight, less than 40% by weight, or no more than 30% by weight, based on total weight of the saccharide-initiated polyether polyol.

Clause 15. The polyurethane foam-forming composition of any one of clause 1 to clause 14, wherein the saccharide-initiated polyol is present in an amount of 30 to 60% by weight, 30 to 50% by weight, or 35 to 45% by weight, based on the total weight of the polyol blend.

Clause 16. The polyurethane foam-forming composition of any one of clause 1 to clause 15, wherein the aromatic polyester polyol has an OH number of 150 to 360 mg KOH/g, 200 to 335 mg KOH/g, or 200 to 250 mg KOH/g, and/or a functionality of 1.5 to 3 or 1.9 to 2.5.

Clause 17. The polyurethane foam-forming composition of any one of clause 1 to clause 16, wherein the aromatic polyester polyol has a content of —$C_2H_4O$— units of less than 50% by weight, based on total weight of the aromatic polyester polyol.

Clause 18. The polyurethane foam-forming composition of any one of clause 1 to clause 17, wherein the aromatic polyester polyol is present in an amount of 5 to 25% by weight, 5 to 20% by weight, or 10 to 20% by weight, based upon the total weight of the polyol blend.

Clause 19. The polyurethane foam-forming composition of any one of clause 1 to clause 18, wherein the aromatic amine-initiated polyether polyol and the saccharide-initiated polyether polyol are present in a weight ratio of at least 0.8:1, 1:1 to 5:1, 1:1 to 2:1 or 1:1 to 1.5:1.

Clause 20. The polyurethane foam-forming composition of any one of clause 1 to clause 19, wherein the aromatic amine-initiated polyether polyol and the aromatic polyester polyol are present in a weight ratio of at least 1:1, 1:1 to 5:1, 2:1 to 4:1 or 2.5:1 to 3.5:1.

Clause 21. The polyurethane foam-forming composition of any one of clause 1 to clause 20, wherein the saccharide-initiated polyether polyol and the aromatic polyester polyol are present in a weight ratio of at least 1:1, 1:1 to 5:1, 2:1 to 4:1 or, 2.5:1 to 3.0:1.

Clause 22. The polyurethane foam-forming composition of any one of clause 1 to clause 21, wherein the polyol blend has a weighted average functionality of 3 to 5, such as 3.5 to 4.5 or 3.8 to 4.2, and/or a weighted average hydroxyl number of 300 to 500 mg KOH/g, such as 350 to 450 mg KOH/g.

Clause 23. The polyurethane foam-forming composition of any one of clause 1 to clause 22, wherein the polyol blend is present in the polyurethane foam-forming composition in an amount of at least 50% by weight, 50 to 90% by weight or 60 to 80% by weight, based on the total weight of the polyurethane foam-forming composition except for the weight of the polyisocyanate.

Clause 24. The polyurethane foam-forming composition of any one of clause 1 to clause 23, wherein the polyol blend has a content of —$C_2H_4O$— units of 4 to 6% by weight or 5 to 6% by weight, based on total weight of the polyurethane foam-forming composition.

Clause 25. The polyurethane foam-forming composition of any one of clause 1 to clause 24, wherein the sum of the amount of the aromatic amine-initiated polyether polyol, the saccharide-initiated polyether polyol, and the aromatic polyester polyol is at least 90% by weight, at least 95% by weight, at least 98% by weight, or 100% by weight, based on the total weight of the polyol blend.

Clause 26. The polyurethane foam-forming composition of any one of clause 1 to clause 25, wherein the polyol blend does not include any filled polyol, such as polymer polyol, PIPA polyol and/or PHD polyol.

Clause 27. The polyurethane foam-forming composition of any one of clause 1 to clause 26, wherein the HCFO comprises 1-chloro-3,3,3-trifluoropropene (HCFO-1233zd, E and/or Z isomer), 2-chloro-3,3,3-trifluoropropene (HCFO-1233xf), HCF01223, 1,2-dichloro-1,2-difluoroethene (E and/or Z isomer), 3,3-dichloro-3-fluoropropene, 2-chloro-1,1,1,4,4,4-hexafluorobutene-2 (E and/or Z isomer), 2-chloro-1,1,1,3,4,4,4-heptafluorobutene-2 (E and/or Z isomer.

Clause 28. The polyurethane foam-forming composition of any one of clause 1 to clause 27, wherein the boiling point, at atmospheric pressure, of the HCFO is at least −25° C., at least −20° C., or at least −19° C., and 40° C. or less, 35° C. or less, or 33° C. or less, such as where the HCFO has a boiling point, at atmospheric pressure, of −25° C. to 40° C., −20° C. to 35° C., or −19° C. to 33° C.

Clause 29. The polyurethane foam-forming composition of any one of clause 1 to clause 28, wherein HCFO is present in an amount of at least 10% by weight, such as 10 to 30% by weight or 10 to 20% by weight or 14 to 18% by weight, based on the total weight of the polyurethane foam-forming composition except for the weight of the polyisocyanate Clause 30. The polyurethane foam-forming composition of any one of clause 1 to clause 29, wherein HCFO is present in amount of at least 90% by weight, at least 95% by weight, at least 99% by weight or 100% by weight, based on the total weight of the physical blowing agent in the blowing agent composition.

Clause 31. The polyurethane foam-forming composition of any one of clause 1 to clause 30, wherein water is present in an amount of 1.70 to 5.0% by weight, 2.0 to 4.0% by weight, or 2.0 to 3.0% by weight, or 2.1 to 2.5% by weight, based on the total weight of the polyurethane foam-forming composition except for the weight of the polyisocyanate.

Clause 32. The polyurethane foam-forming composition of any one of clause 1 to clause 31, wherein the physical blowing agent composition and the water are present in a relative ratio, by weight, of at least 5:1, such as 5:1 to 50:1, 5:1 to 20:1 or, in some cases, 5:1 to 9:1 or 7:1 to 8:1.

Clause 33. The polyurethane foam-forming composition of any one of clause 1 to clause 32, wherein the polyurethane foam-forming composition comprises a surfactant, such as a polyether-modified polysiloxane.

Clause 34. The polyurethane foam-forming composition of any one of clause 1 to clause 33, wherein the polyurethane foam-forming composition comprises a catalyst, such as a tertiary amine and/or an organometallic, such as where the tertiary amine comprises pentamethyldiethylenetriamine, N,N-dimethylcyclohexylamine, N,N',N"-tris(3-dimethyl-aminopropyl-)hexahydrotriazine, tetramethylethylenediamine, tetraethylene diamine, benzyldimethylamine or a combination thereof and/or the organometallic catalyst comprises dibutyltin dilaurate, dibutyltin diacetate, stannous octoate, potassium octoate, potassium acetate, potassium 2-ethylhexanoate, or a combination thereof.

Clause 35. A polyurethane foam produced from the polyurethane foam-forming composition of any one of clause 1 to clause 34, wherein the polyurethane foam has a closed-cell content of more than 80 percent, more than 85 percent, or more than 88 percent, as measured according to ASTM D6226-15.

Clause 36. The polyurethane foam of clause 35, wherein the polyurethane foam has a thermal conductivity measured at 35° F. (2° C.) of less than 0.126 BTU-in/h-ft2-° F. and measured at 75° F. (24° C.) of less than 0.140 BTU-in/h-ft2-° F. for foam from the core of 2-inch thick panels, as measured according to ASTM C518-15.

Clause 37. A composite element comprising the polyurethane foam of clause 35 or clause 36 sandwiched between one or more facer substrates, such as where the facer substrate is constructed of plastic, such a polypropylene resin reinforced with continuous bi-directional glass fibers or a fiberglass reinforced polyester copolymer, paper, wood, or metal.

Clause 38. A refrigeration apparatus, such as a refrigerator, freezer, trailer, or cooler comprising the composite element of clause 37.

Clause 39. A method of producing a polyurethane foam, comprising reacting, at an isocyanate index of 1.01 to less than 1.15, a polyurethane foam-forming composition comprising a polyol blend, a polyisocyanate, and a blowing agent composition, wherein: (a) the polyol blend comprises (1) at least 30% by weight, based on total weight of the polyol blend, of an aromatic amine-initiated polyether polyol having a functionality of at least 2.5 and an OH number of 200 to 600 mg KOH/g; (2) at least 30% by weight, based on total weight of the polyol blend, of a saccharide-initiated polyether polyol having a functionality of 4 to 6 and an OH number of 200 to 600 g/KOH gram; and (3) 1 to 25% by weight, based on total weight of the polyol blend, of an aromatic polyester polyol having a functionality of 1.5 to 3 and an OH number of 150 to 410 mg KOH/g, wherein the polyol blend has a content of —$C_2H_4O$— units of 3 to 6% by weight, based on the total weight of the polyurethane foam-forming composition; (b) the blowing agent composition comprises: (1) a physical blowing agent and (2) water present in an amount of at least 1.70% by weight, based on the total weight of the polyurethane foam-forming composition except for the weight of the polyisocyanate, wherein (i) the physical blowing agent comprises a hydrochlorofluoroolefin that is present in an amount of 5% to 15% by weight, based on total weight of the polyurethane foam-forming composition and in an amount of at least 80% by weight, based on total weight of physical blowing agent in the blowing agent composition, and (ii) the physical blowing agent composition and the water are present in a relative ratio, by weight, of 5:1 to 50:1.

Clause 40. The method of clause 39, wherein the aromatic amine used to produce the aromatic amine-initiated polyether polyol has an amine functionality of at least 1, 1 to 3, or 1 to 2.

Clause 41. The method of clause 39 or clause 40, wherein the aromatic amine used to produce the aromatic amine-initiated polyether polyol comprises 2,3-TDA, 3,4-TDA, 2,4-TDA, 2,6-TDA or a mixture thereof, such as a mixture comprising 2,3-TDA and 3,4-TDA.

Clause 42. The method of any one of clause 39 to clause 41, wherein aromatic amine is present in an amount of more than 50% by weight, at least 80% by weight, at least 90% by weight, or 100% by weight, based on the total weight of H-functional starter used to produce the aromatic amine-initiated polyether polyol.

Clause 43. The method of any one of clause 39 to clause 42, wherein propylene oxide is used in an amount of more than 50% by weight, at least 80% by weight, at least 90% by weight, or 100% by weight, based on total weight of alkylene oxide used to prepare the aromatic amine-initiated polyether polyol.

Clause 44. The method of clause 43, wherein ethylene oxide is used in an amount of no more than 10% by weight, no more than 5% by weight, no more than 1% by weight, or 0% by weight, based on the total weight of alkylene oxide used to prepare the aromatic amine-initiated polyether polyol.

Clause 45. The method of any one of clause 39 to clause 44, wherein the aromatic amine-initiated polyether polyol has an OH number of 300 to 500 mg KOH/g or 380 to 420 mg KOH/g and/or an average functionality of 3.5 to 4.5, 3.8 to 4.2 or 4.0.

Clause 46. The method of any one of clause 39 to clause 45, wherein the aromatic amine-initiated polyether polyol has a content of —$C_2H_4O$— units of less than 10% by weight, less than 5% by weight, less than 2% by weight, or 0% by weight, based on total weight of the aromatic amine-initiated polyether polyol.

Clause 47. The method of any one of clause 39 to clause 46, wherein the aromatic amine-initiated polyether polyol is present in an amount of 30 to 80% by weight, 30 to 60% by weight, 40 to 60% by weight or 40 to 50% by weight, based on the total weight of the polyol blend.

Clause 48. The method of any one of clause 39 to clause 47, wherein saccharide is present in an amount of more than 50% by weight, at least 70% by weight or at least 80% by weight, based on the total weight of H-functional starter used to produce the saccharide-initiated polyether polyol.

Clause 49. The method of any one of clause 39 to clause 48, wherein propylene oxide is present in an amount of more than 50% by weight, at least 60% by weight, or at least 70% by weight, based on the total weight of alkylene oxide used to prepare the saccharide-initiated polyether polyol.

Clause 50. The method of clause 49, wherein ethylene oxide is present in an amount of no more than 50% by weight, no more than 40% by weight, or no more than 30% by weight, based on the total weight of alkylene oxide used to prepare that saccharide-initiated polyether polyol.

Clause 51. The method of any one of clause 39 to clause 50, wherein the saccharide-initiated polyether polyol has an OH number of 200 to 600 mg KOH/g, 300 to 550 mg KOH/g, 380 to 500 mg KOH/g, or 450 to 500 mg KOH/g, and/or a functionality of 4 to 6, 5 to 6, 5.2 to 5.8, or 5.2 to 5.6.

Clause 52. The method of any one of clause 39 to clause 51, wherein the saccharide-initiated polyether polyol has a content of —$C_2H_4O$— units of less than 50% by weight, less than 40% by weight, or no more than 30% by weight, based on total weight of the saccharide-initiated polyether polyol.

Clause 53. The method of any one of clause 39 to clause 52, wherein the saccharide-initiated polyol is present in an amount of 30 to 60% by weight, 30 to 50% by weight, or 35 to 45% by weight, based on the total weight of the polyol blend.

Clause 54. The method of any one of clause 39 to clause 53, wherein the aromatic polyester polyol has an OH number of 150 to 360 mg KOH/g, 200 to 335 mg KOH/g, or 200 to 250 mg KOH/g, and/or a functionality of 1.5 to 3 or 1.9 to 2.5.

Clause 55. The method of any one of clause 39 to clause 53, wherein the aromatic polyester polyol has a content of —$C_2H_4O$— units of less than 50% by weight, based on total weight of the aromatic polyester polyol.

Clause 56. The method of any one of clause 39 to clause 54, wherein the aromatic polyester polyol is present in an amount of 5 to 25% by weight, 5 to 20% by weight, or 10 to 20% by weight, based upon the total weight of the polyol blend.

Clause 57. The method of any one of clause 39 to clause 55, wherein the aromatic amine-initiated polyether polyol and the saccharide-initiated polyether polyol are present in a weight ratio of at least 0.8:1, 1:1 to 5:1, 1:1 to 2:1 or 1:1 to 1.5:1.

Clause 58. The method of any one of clause 39 to clause 57, wherein the aromatic amine-initiated polyether polyol and the aromatic polyester polyol are present in a weight ratio of at least 1:1, 1:1 to 5:1, 2:1 to 4:1 or 2.5:1 to 3.5:1.

Clause 59. The method of any one of clause 39 to clause 58, wherein the saccharide-initiated polyether polyol and the aromatic polyester polyol are present in a weight ratio of at least 1:1, 1:1 to 5:1, 2:1 to 4:1 or, 2.5:1 to 3.0:1.

Clause 60. The method of any one of clause 39 to clause 59, wherein the polyol blend has a weighted average functionality of 3 to 5, such as 3.5 to 4.5 or 3.8 to 4.2, and/or a weighted average hydroxyl number of 300 to 500 mg KOH/g, such as 350 to 450 mg KOH/g.

Clause 61. The method of any one of clause 39 to clause 60, wherein the polyol blend is present in the polyurethane foam-forming composition in an amount of at least 50% by weight, 50 to 90% by weight or 60 to 80% by weight, based on the total weight of the polyurethane foam-forming composition except for the weight of the polyisocyanate.

Clause 62. The method of any one of clause 39 to clause 61, wherein the polyol blend has a content of —$C_2H_4O$— units of 4 to 6% by weight or 5 to 6% by weight, based on total weight of the polyurethane foam-forming composition.

Clause 63. The method of any one of clause 39 to clause 62, wherein the sum of the amount of the aromatic amine-initiated polyether polyol, the saccharide-initiated polyether polyol, and the aromatic polyester polyol is at least 90% by weight, at least 95% by weight, at least 98% by weight, or 100% by weight, based on the total weight of the polyol blend.

Clause 64. The method of any one of clause 39 to clause 63, wherein the polyol blend does not include any filled polyol, such as polymer polyol, PIPA polyol and/or PHD polyol.

Clause 65. The method of any one of clause 39 to clause 64, wherein the HCFO comprises 1-chloro-3,3,3-trifluoropropene (HCFO-1233zd, E and/or Z isomer), 2-chloro-3,3,3-trifluoropropene (HCFO-1233xf), HCF01223, 1,2-dichloro-1,2-difluoroethene (E and/or Z isomer), 3,3-dichloro-3-fluoropropene, 2-chloro-1,1,1,4,4,4-hexafluorobutene-2 (E and/or Z isomer), 2-chloro-1,1,1,3,4,4,4-heptafluorobutene-2 (E and/or Z isomer.

Clause 66. The method of any one of clause 39 to clause 65, wherein the boiling point, at atmospheric pressure, of the HCFO is at least −25° C., at least −20° C., or at least −19° C., and 40° C. or less, 35° C. or less, or 33° C. or less, such as where the HCFO has a boiling point, at atmospheric pressure, of −25° C. to 40° C., −20° C. to 35° C., or −19° C. to 33° C.

Clause 67. The method of any one of clause 39 to clause 66, wherein HCFO is present in an amount of at least 10% by weight, such as 10 to 30% by weight or 10 to 20% by weight or 14 to 18% by weight, based on the total weight of the polyurethane foam-forming composition except for the weight of the polyisocyanate.

Clause 68. The method of any one of clause 39 to clause 67, wherein HCFO is present in amount of at least 90% by weight, at least 95% by weight, at least 99% by weight or 100% by weight, based on the total weight of the physical blowing agent in the blowing agent composition.

Clause 69. The method of any one of clause 39 to clause 68, wherein the water is present in an amount of 1.70 to 5.0% by weight, 2.0 to 4.0% by weight, or 2.0 to 3.0% by weight, or 2.1 to 2.5% by weight, based on the total weight of the polyurethane foam-forming composition except for the weight of the polyisocyanate.

Clause 70. The method of any one of clause 39 to clause 69, wherein the physical blowing agent composition and the water are present in a relative ratio, by weight, of at least 5:1, such as 5:1 to 50:1, 5:1 to 20:1 or, in some cases, 5:1 to 9:1 or 7:1 to 8:1.

Clause 71. The method of any one of clause 39 to clause 70, wherein the polyurethane foam-forming composition comprises a surfactant, such as a polyether-modified polysiloxane.

Clause 72. The method of any one of clause 39 to clause 71, wherein the polyurethane foam-forming composition comprises a catalyst, such as a tertiary amine and/or an organometallic, such as where the tertiary amine comprises pentamethyldiethylenetriamine, N,N-dimethylcyclohexylamine, N,N',N''-tris(3-dimethylaminopropyl-)hexahydrotriazine, tetramethylethylenediamine, tetraethylene diamine, benzyldimethylamine or a combination thereof and/or the organometallic catalyst comprises dibutyltin dilaurate, dibutyltin diacetate, stannous octoate, potassium octoate, potassium acetate, potassium 2-ethylhexanoate, or a combination thereof.

Clause 73. A polyurethane foam produced by the method of any one of clause 39 to clause 72.

Clause 74. The polyurethane foam of clause 73, wherein the polyurethane foam has a closed-cell content of more than 80 percent, more than 85 percent, or more than 88 percent, as measured according to ASTM D6226-15.

Clause 75. The polyurethane foam of clause 73 or clause 74, wherein the polyurethane foam has a thermal conductivity measured at 35° F. (2° C.) of less than 0.126 BTU-in/h-ft2-° F. and measured at 75° F. (24° C.) of less than 0.140 BTU-in/h-ft2-° F. for foam from the core of 2-inch thick panels, as measured according to ASTM C518-15.

Clause 76. A composite element comprising the polyurethane foam of one of clause 73 to clause 75 sandwiched between one or more facer substrates, such as where the facer substrate is constructed of plastic, such a polypropylene resin reinforced with continuous bi-directional glass fibers or a fiberglass reinforced polyester copolymer, paper, wood, or metal.

Clause 77. A refrigeration apparatus, such as a refrigerator, freezer, trailer, or cooler comprising the composite element of clause 76.

Clause 78. An isocyanate-reactive composition, comprising: (a) polyol blend comprising: (1) at least 30% by weight, based on total weight of the polyol blend, of an aromatic amine-initiated polyether polyol having a functionality of at least 2.5 and an OH number of 200 to 600 mg KOH/g; (2) at least 30% by weight, based on total weight of the polyol blend, of a saccharide-initiated polyether polyol having a functionality of 4 to 6 and an OH number of 200 to 600 g/KOH gram; and (3) 1 to 25% by weight, based on total weight of the polyol blend, of an aromatic polyester polyol having a functionality of 1.5 to 3 and an OH number of 150 to 410 mg KOH/g, wherein the polyol blend has a content of —$C_2H_4O$— units of 5 to 15% by weight, based on the total weight of the isocyanate-reactive composition; and (b) a blowing agent composition comprising: (1) a physical blowing agent and (2) water present in an amount of at least 1.70% by weight, based on the total weight of the isocyanate-reactive composition, wherein (i) the physical blowing agent comprises a hydrochlorofluoroolefin that is present in an amount of 10% to 30% by weight, based on total weight of the isocyanate-reactive composition and in an amount of at least 80% by weight, based on total weight of physical blowing agent in the blowing agent composition, and (ii) the physical blowing agent composition and the water are present in a relative ratio, by weight, of 5:1 to 50:1.

Clause 79. The isocyanate-reactive composition of clause 78, wherein the aromatic amine used to produce the aromatic amine-initiated polyether polyol has an amine functionality of at least 1, 1 to 3, or 1 to 2.

Clause 80. The isocyanate-reactive composition of clause 78 or clause 79, wherein the aromatic amine used to produce the aromatic amine-initiated polyether polyol comprises 2,3-TDA, 3,4-TDA, 2,4-TDA, 2,6-TDA or a mixture thereof, such as a mixture comprising 2,3-TDA and 3,4-TDA.

Clause 81. The isocyanate-reactive composition of any one of clause 78 to clause 80, wherein aromatic amine is present in an amount of more than 50% by weight, at least 80% by weight, at least 90% by weight, or 100% by weight, based on the total weight of H-functional starter used to produce the aromatic amine-initiated polyether polyol.

Clause 82. The isocyanate-reactive composition of any one of clause 78 to clause 81, wherein propylene oxide is used in an amount of more than 50% by weight, at least 80% by weight, at least 90% by weight, or 100% by weight, based on total weight of alkylene oxide used to prepare the aromatic amine-initiated polyether polyol.

Clause 83. The isocyanate-reactive composition of clause 82, wherein ethylene oxide is used in an amount of no more than 10% by weight, no more than 5% by weight, no more than 1% by weight, or 0% by weight, based on the total weight of alkylene oxide used to prepare the aromatic amine-initiated polyether polyol.

Clause 84. The isocyanate-reactive composition of any one of clause 78 to clause 83, wherein the aromatic amine-initiated polyether polyol has an OH number of 300 to 500 mg KOH/g or 380 to 420 mg KOH/g and/or an average functionality of 3.5 to 4.5, 3.8 to 4.2 or 4.0.

Clause 85. The isocyanate-reactive composition of any one of clause 78 to clause 84, wherein the aromatic amine-initiated polyether polyol has a content of —$C_2H_4O$— units of less than 10% by weight, less than 5% by weight, less than 2% by weight, or 0% by weight, based on total weight of the aromatic amine-initiated polyether polyol.

Clause 86. The isocyanate-reactive composition of any one of clause 78 to clause 85, wherein the aromatic amine-initiated polyether polyol is present in an amount of 30 to 80% by weight, 30 to 60% by weight, 40 to 60% by weight or 40 to 50% by weight, based on the total weight of the polyol blend.

Clause 87. The isocyanate-reactive composition of any one of clause 78 to clause 86, wherein saccharide is present in an amount of more than 50% by weight, at least 70% by weight or at least 80% by weight, based on the total weight of H-functional starter used to produce the saccharide-initiated polyether polyol.

Clause 88. The isocyanate-reactive composition of any one of clause 78 to clause 87, wherein propylene oxide is present in an amount of more than 50% by weight, at least 60% by weight, or at least 70% by weight, based on the total weight of alkylene oxide used to prepare the saccharide-initiated polyether polyol.

Clause 89. The isocyanate-reactive composition of clause 88, wherein ethylene oxide is present in an amount of no more than 50% by weight, no more than 40% by weight, or no more than 30% by weight, based on the total weight of alkylene oxide used to prepare that saccharide-initiated polyether polyol.

Clause 90. The isocyanate-reactive composition of any one of clause 78 to clause 89, wherein the saccharide-initiated polyether polyol has an OH number of 200 to 600 mg KOH/g, 300 to 550 mg KOH/g, 380 to 500 mg KOH/g, or 450 to 500 mg KOH/g, and/or a functionality of 4 to 6, 5 to 6, 5.2 to 5.8, or 5.2 to 5.6.

Clause 91. The isocyanate-reactive composition of any one of clause 78 to clause 90, wherein the saccharide-initiated polyether polyol has a content of —$C_2H_4O$— units of less than 50% by weight, less than 40% by weight, or no more than 30% by weight, based on total weight of the saccharide-initiated polyether polyol.

Clause 92. The isocyanate-reactive composition of any one of clause 78 to clause 91, wherein the saccharide-initiated polyol is present in an amount of 30 to 60% by weight, 30 to 50% by weight, or 35 to 45% by weight, based on the total weight of the polyol blend.

Clause 93. The isocyanate-reactive composition of any one of clause 78 to clause 92, wherein the aromatic polyester polyol has an OH number of 150 to 360 mg KOH/g, 200 to 335 mg KOH/g, or 200 to 250 mg KOH/g, and/or a functionality of 1.5 to 3 or 1.9 to 2.5.

Clause 94. The isocyanate-reactive composition of any one of clause 78 to clause 93, wherein the aromatic polyester polyol has a content of —$C_2H_4O$— units of less than 50% by weight, based on total weight of the aromatic polyester polyol.

Clause 95. The isocyanate-reactive composition of any one of clause 78 to clause 94, wherein the aromatic polyester polyol is present in an amount of 5 to 25% by weight, 5 to 20% by weight, or 10 to 20% by weight, based upon the total weight of the polyol blend.

Clause 96. The isocyanate-reactive composition of any one of clause 78 to clause 95, wherein the aromatic amine-initiated polyether polyol and the saccharide-initiated polyether polyol are present in a weight ratio of at least 0.8:1, 1:1 to 5:1, 1:1 to 2:1 or 1:1 to 1.5:1.

Clause 97. The isocyanate-reactive composition of any one of clause 78 to clause 96, wherein the aromatic amine-initiated polyether polyol and the aromatic polyester polyol are present in a weight ratio of at least 1:1, 1:1 to 5:1, 2:1 to 4:1 or 2.5:1 to 3.5:1.

Clause 98. The isocyanate-reactive composition of any one of clause 78 to clause 97, wherein the saccharide-initiated polyether polyol and the aromatic polyester polyol are present in a weight ratio of at least 1:1, 1:1 to 5:1, 2:1 to 4:1 or, 2.5:1 to 3.0:1.

Clause 99. The isocyanate-reactive composition of any one of clause 78 to clause 98, wherein the polyol blend has a weighted average functionality of 3 to 5, such as 3.5 to 4.5 or 3.8 to 4.2, and/or a weighted average hydroxyl number of 300 to 500 mg KOH/g, such as 350 to 450 mg KOH/g.

Clause 100. The isocyanate-reactive composition of any one of clause 78 to clause 99, wherein the polyol blend is present in the polyurethane foam-forming composition in an amount of at least 50% by weight, 50 to 90% by weight or 60 to 80% by weight, based on the total weight of the isocyanate-reactive composition.

Clause 101. The isocyanate-reactive composition of any one of clause 78 to clause 100, wherein the polyol blend has a content of —$C_2H_4O$— units of 8 to 15% by weight, 8 to 12% by weight or 10 to 12% by weight, based on total weight of the isocyanate-reactive composition.

Clause 102. The isocyanate-reactive composition of any one of clause 78 to clause 101, wherein the sum of the amount of the aromatic amine-initiated polyether polyol, the saccharide-initiated polyether polyol, and the aromatic polyester polyol is at least 90% by weight, at least 95% by weight, at least 98% by weight, or 100% by weight, based on the total weight of the polyol blend.

Clause 103. The isocyanate-reactive composition of any one of clause 78 to clause 102, wherein the polyol blend does not include any filled polyol, such as polymer polyol, PIPA polyol and/or PHD polyol.

Clause 104. The isocyanate-reactive composition of any one of clause 78 to clause 103, wherein the HCFO comprises 1-chloro-3,3,3-trifluoropropene (HCFO-1233zd, E and/or Z isomer), 2-chloro-3,3,3-trifluoropropene (HCFO-1233xf), HCFO1223, 1,2-dichloro-1,2-difluoroethene (E and/or Z isomer), 3,3-dichloro-3-fluoropropene, 2-chloro-1,1,1,4,4,4-hexafluorobutene-2 (E and/or Z isomer), 2-chloro-1,1,1,3,4,4,4-heptafluorobutene-2 (E and/or Z isomer.

Clause 105. The isocyanate-reactive composition of any one of clause 78 to clause 104, wherein the boiling point, at atmospheric pressure, of the HCFO is at least −25° C., at least −20° C., or at least −19° C., and 40° C. or less, 35° C. or less, or 33° C. or less, such as where the HCFO has a boiling point, at atmospheric pressure, of −25° C. to 40° C., −20° C. to 35° C., or −19° C. to 33° C.

Clause 106. The isocyanate-reactive composition of any one of clause 78 to clause 105, wherein HCFO is present in an amount of at least 10% by weight, 10 to 30% by weight, 10 to 20% by weight or 14 to 18% by weight, based on the total weight of the isocyanate-reactive composition.

Clause 107. The isocyanate-reactive composition of any one of clause 78 to clause 106, wherein HCFO is present in amount of at least 90% by weight, at least 95% by weight, at least 99% by weight or 100% by weight, based on the total weight of the physical blowing agent in the blowing agent composition.

Clause 108. The isocyanate-reactive composition of any one of clause 78 to clause 107, wherein the water is present in an amount of 1.70 to 5.0% by weight, 2.0 to 4.0% by weight, or 2.0 to 3.0% by weight, or 2.1 to 2.5% by weight, based on the total weight of the isocyanate-reactive composition.

Clause 109. The isocyanate-reactive composition of any one of clause 78 to clause 108, wherein the physical blowing agent composition and the water are present in a relative ratio, by weight, of at least 5:1, such as 5:1 to 50:1, 5:1 to 20:1 or, in some cases, 5:1 to 9:1 or 7:1 to 8:1.

Clause 110. The isocyanate-reactive composition of any one of clause 78 to clause 109, wherein the isocyanate-reactive composition comprises a surfactant, such as a polyether-modified polysiloxane.

Clause 111. The isocyanate-reactive composition of any one of clause 78 to clause 110, wherein the isocyanate-reactive composition comprises a catalyst, such as a tertiary amine and/or an organometallic, such as where the tertiary amine comprises pentamethyldiethylenetriamine, N,N-dimethylcyclohexylamine, N,N',N"-tris(3-dimethylaminopropyl-)hexahydrotriazine, tetramethylethylenediamine, tetraethylene diamine, benzyldimethylamine or a combination thereof and/or the organometallic catalyst comprises dibutyltin dilaurate, dibutyltin diacetate, stannous octoate, potassium octoate, potassium acetate, potassium 2-ethylhexanoate, or a combination thereof.

Clause 112. A polyurethane foam comprising a reaction product of the isocyanate-reactive composition of any one of clause 78 to clause 111 with a polyisocyanate, wherein the polyurethane foam has a closed-cell content of more than 80 percent, more than 85 percent, or more than 88 percent, as measured according to ASTM D6226-15.

Clause 113. The polyurethane foam of clause 112, wherein the polyurethane foam has a thermal conductivity measured at 35° F. (2° C.) of less than 0.126 BTU-in/h-ft2-° F. and measured at 75° F. (24° C.) of less than 0.140 BTU-in/h-ft2-° F. for foam from the core of 2-inch thick panels, as measured according to ASTM C518-15.

Clause 114. A composite element comprising the polyurethane foam of clause 112 or clause 113 sandwiched between one or more facer substrates, such as where the facer substrate is constructed of plastic, such a polypropylene resin reinforced with continuous bi-directional glass fibers or a fiberglass reinforced polyester copolymer, paper, wood, or metal.

Clause 115. A refrigeration apparatus, such as a refrigerator, freezer, trailer, or cooler comprising the composite element of clause 114.

The non-limiting and non-exhaustive examples that follow are intended to further describe various non-limiting and non-exhaustive implementations without restricting the scope of the implementations described in this specification.

EXAMPLES

Foam-forming compositions were prepared using the ingredients and amounts (in parts by weight) set forth in Table 1. The following materials were used:

POLYOL 1: a polyether polyol having a hydroxyl number of 388 mg KOH/g and a functionality of 4, prepared by alkoxylating o-TDA, in which the alkylene oxide is 37% by weight ethylene oxide and 63% by weight propylene oxide so that the polyether polyol has a content of —$C_2H_4O$— units of 29.2% by weight, based on total weight of the polyether polyol;

POLYOL 2: a polyether polyol having a hydroxyl number of 470 mg KOH/g and a functionality of 5.5, prepared by alkoxylating a mixture of sucrose and water, in which the alkylene oxide is 30% by weight ethylene oxide and 70% by weight propylene oxide so that the polyether polyol has a content of —$C_2H_4O$— units of 20.5% by weight, based on total weight of the polyether polyol POLYOL 3: a polyether polyol having a hydroxyl number of 400 mg KOH/g and a functionality of 4, prepared by alkoxylating o-TDA, in which the alkylene oxide is 100% propylene oxide so that the polyether polyol has no —$C_2H_4O$— units;

POLYOL 4: a polyether polyol having a hydroxyl number of 380 mg KOH/g and a functionality of 5.3, prepared by alkoxylating a mixture of sucrose and water, in which the alkylene oxide is 100% propylene oxide so that the polyether polyol has no —$C_2H_4O$— units;

POLYOL 5: an aromatic polyester polyol having an OH number of 240 mg KOH/g and a functionality of 2, and a content of —$C_2H_4O$— units of 44.9% by weight, based on total weight of the aromatic polyester polyol;

SURFACTANT: Dabco® DC5357 from Evonik;

CATALYST 1: N,N,N',N",N"-pentamethyldiethylenetriamine, Polycat™ 5 from Evonik;

CATALYST 2: a solution of potassium-octoate in diethylene glycol, Dabco® K-15 from Evonik;

BLOWING AGENT: trans-1,1,1-trifluoro-3-chloropropene, Solstice® from Honeywell International Inc.;

ISO 1: polymeric diphenylmethane diisocyanate (pMDI); NCO weight 31.5%; viscosity 200 mPa s @ 25° C. (MONDUR® MR from Covestro).

Foams were prepared using a HK-100 high-pressure foam machine. The liquid output was maintained at a constant 21° C. for the Resin and 27° C. for the Isocyanate side with an output range of 454 grams/second. Foam was shot into a 79"×8"×2"(200×20×5 cm) mold between heated platens with a target overpack of 10% based on minimum fill density. The platens were maintained at 49° C. The foam remained in the mold and was allowed to cure for 10 minutes at 49° C. before removing. An 8"×8"×1" section of foam was sampled from the panels and used for k-factor testing according to ASTM C518. Lid opening swell was determined by foaming the aforementioned mold at an overpack level of 10% and allowing the part to demold for 2 minutes. After 2 minutes, the lid clamps were removed and the lid allowed to open based on the degree of foam swelling. The degree of swelling was measured at 30 seconds, 180 seconds, and 300 seconds after the lid clamps were removed. Jumbo tool demold was determined by foaming a 70 cm×40 cm×9 cm closed mold via a shot port at a mold temperature of 45° C. with an amount of foam to achieve a foam density of either 2.10 or 2.30 pcf. After the foam was dispensed, the shot port was closed with a cork and the foam allowed to cure for the specified amount of time (2, 3, or 4 minutes). After the specified demold time, the mold lid was opened and the part removed and allowed to rest overnight. After 24 hours, the thickness of the part was measured at the centermost point to determine the degree of foam swelling.

Figure 1:
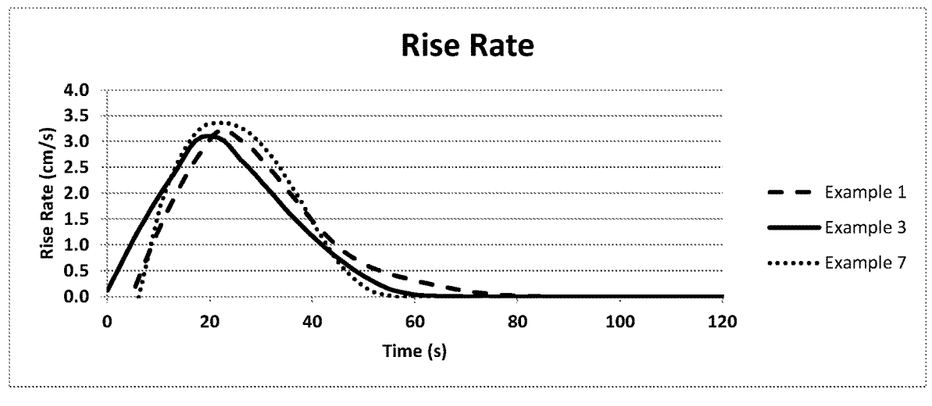
FIG. 1 is a graph of the rise rate pressure profiles of some of the Example foams.

Flow was evaluated as described in U.S. Pat. No. 10,106,641 (at col. 12, lines 22-61, the cited portion of which being incorporated herein by reference). Additionally, a pressure transducer was located 10 cm above the protruding sheet metal-based edge, which recorded the foaming pressure during the process. The rise rate was derived from the foam height data as a function of time. Rise rate profiles for selected examples are displayed in FIG. 1. These examples illustrate flow improvements, particularly early maximum rise rate and general flow, which is currently believed to result in improved cell structure and foam performance, leading to improved k-factor, i.e., improved thermal insulation.

Results are set forth in Table 1. Examples 2-7 are inventive examples and Example 1 is a comparative example.

TABLE 1

| Component | Ex. 1 | Ex. 2 | Ex. 3 | Ex. 4 | Ex. 5 | Ex. 6 | Ex. 7 |
|---|---|---|---|---|---|---|---|
| POLYOL 1 | 30.10 | 30.57 | 31.14 | 31.30 | 31.30 | 31.30 | 31.18 |
| POLYOL 2 | 32.94 | 33.45 | 34.07 | 34.25 | 34.25 | 34.25 | 34.11 |
| POLYOL 3 | 11.01 | 11.18 | 11.39 | 11.45 | 11.45 | 11.45 | 11.41 |
| SURFACTANT | 2.90 | 2.90 | 2.90 | 2.90 | 2.90 | 2.90 | 2.90 |
| CATALYST 1 | 0.85 | 0.85 | 0.90 | 0.85 | 0.90 | 0.90 | 1.05 |
| CATALYST 2 | 0.55 | 0.55 | 0.50 | 0.50 | 0.35 | 0.25 | 0.50 |
| Water | 1.65 | 1.80 | 2.05 | 2.10 | 2.20 | 2.30 | 2.20 |
| BLOWING AGENT | 20.00 | 18.70 | 17.10 | 16.65 | 16.65 | 16.65 | 16.65 |
| ISO | ISO 1 | ISO 1 | ISO 1 | ISO 1 | ISO 1 | ISO 1 | ISO 1 |
| INDEX | 1.18 | 1.14 | 1.09 | 1.08 | 1.06 | 1.05 | 1.06 |
| —$C_2H_4O$— units in foam-forming composition[1] | 5.2 | 5.3 | 5.4 | 5.4 | 5.4 | 5.4 | 5.4 |

RESULTS

| | Ex. 1 | Ex. 2 | Ex. 3 | Ex. 4 | Ex. 5 | Ex. 6 | Ex. 7 |
|---|---|---|---|---|---|---|---|
| Cream Time (sec) | Froth | Froth | Froth | Froth | Froth | Froth | Froth |
| Gel Time (sec) | 33 | 28 | 30 | 28 | 29 | 29 | 18 |
| Free-Rise Density (pcf) | 1.43 | 1.31 | 1.30 | 1.38 | 1.36 | 1.37 | 1.25 |
| Bosch Min. Fill Density (pcf) | 2.03 | 2.10 | 2.09 | 2.12 | 2.05 | 2.04 | 2.05 |
| Packed Density (10%, pcf) | 2.26 | 2.32 | 2.31 | 2.35 | 2.27 | 2.26 | 2.28 |
| Core Density (pcf) | 2.04 | 2.14 | 2.08 | 2.10 | 2.03 | 2.02 | 2.03 |
| Overall vs Core Density Ratio | 1.11 | 1.08 | 1.11 | 1.12 | 1.12 | 1.12 | 1.12 |
| Closed Cell Content (%) | 90.8 | 91.0 | 91.4 | 91.6 | 91.2 | 91.4 | 91.0 |
| K-factor @ 35° F. (((BTU * in)/(h * ft2 * ° F.)) | 0.113 | 0.114 | 0.117 | 0.117 | 0.117 | 0.118 | 0.117 |
| K-factor @ 75° F. (((BTU * in)/(h * ft2 * ° F.)) | 0.129 | 0.129 | 0.132 | 0.132 | 0.132 | 0.134 | 0.132 |
| Compressive Strength + (psi) | 22.7 | 23.3 | 23.1 | 25.4 | 22.7 | 23.5 | 24.1 |
| Compressive Strength = (psi) | 38.2 | 42.5 | 42.9 | 46.4 | 43.9 | 43.0 | 43.8 |
| Dimensional Stability −30° C. @ 1 day (%) | 0.1 | 0.3 | 0.1 | 0.0 | −0.1 | 0.0 | 0.0 |
| Dimensional Stability −30° C. @ 7 days (%) | 0.1 | 0.2 | 0.2 | −0.3 | −0.2 | −0.1 | 0.1 |
| Dimensional Stability 70° C. @ 1 day (%) | −1.0 | −0.3 | −0.9 | −1.1 | −1.0 | −1.2 | −1.0 |
| Dimensional Stability 70° C. @ 7 days (%) | −0.9 | −0.2 | −0.2 | −0.9 | −0.5 | −0.6 | −0.9 |
| Lid Opening @ 0.5 min (in); 10% OP | 0.057 | 0.142 | 0.093 | 0.127 | 0.124 | 0.145 | 0.092 |
| Lid Opening @ 3 min (in); 10% OP | 0.049 | 0.132 | 0.085 | 0.119 | 0.106 | 0.134 | 0.083 |
| Lid Opening @ 5 min (in); 10% OP | 0.040 | 0.122 | 0.076 | 0.109 | 0.098 | 0.126 | 0.076 |
| Jumbo Tool: 2.10 pcf @ 2 min (mm) | 9.3 | 7.3 | 10.2 | 6.3 | 9.1 | 9.3 | 9.6 |
| Jumbo Tool: 2.10 pcf @ 3 min (mm) | 8.5 | 5.0 | 7.5 | 5.5 | 6.7 | 6.7 | 7.1 |
| Jumbo Tool: 2.10 pcf @ 4 min (mm) | 8.0 | 5.3 | 7.0 | 4.0 | 5.3 | 6.0 | 6.0 |
| Jumbo Tool: 2.30 pcf @ 2 min (mm) | 10.1 | 9.9 | 12.5 | 6.6 | 8.5 | 11.4 | 11.2 |
| Jumbo Tool: 2.30 pcf @ 3 min (mm) | 9.5 | 8.7 | 9.2 | 6.0 | 7.1 | 7.2 | 7.5 |
| Jumbo Tool: 2.30 pcf @ 4 min (mm) Flow | 8.1 | 8.0 | 8.3 | 5.4 | 6.0 | 6.8 | 7.1 |
| Max Pressure (hPa) | 157 | 174 | 193 | 177 | 189 | 195 | 208 |
| Final Height (cm) | 102 | 101 | 101 | 102 | 106 | 105 | 104 |
| Max Rise Time (s) | 19 | 23 | 24 | 19 | 22 | 23 | 19 |
| Max Rise Rate (cm/s) | 3.1 | 2.9 | 3.1 | 3.4 | 3.4 | 3.3 | 3.9 |

[1]Reported value is based on total weight of the foam-forming composition.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A polyurethane foam-forming composition comprising:
   (a) a polyol blend comprising:
      (1) at least 30% by weight, based on total weight of the polyol blend, of an aromatic amine-initiated polyether polyol having a functionality of at least 2.5 and an OH number of 200 to 600 mg KOH/g;
      (2) at least 30% by weight, based on total weight of the polyol blend, of a saccharide-initiated polyether polyol having a functionality of 4 to 6 and an OH number of 200 to 600 g/KOH gram; and
      (3) 1 to 25% by weight, based on total weight of the polyol blend, of an aromatic polyester polyol having a functionality of 1.5 to 3 and an OH number of 150 to 410 mg KOH/g,
      wherein the polyol blend has a content of $-C_2H_4O-$ units of 3 to 6% by weight, based on the total weight of the polyurethane foam-forming composition;
   (b) a polyisocyanate present in an amount sufficient to provide an isocyanate index of 1.01 to less than 1.15; and
   (c) a blowing agent composition comprising:
      (1) a physical blowing agent; and
      (2) water present in an amount of at least 1.70% by weight, based on the total weight of the polyurethane foam-forming composition except for the weight of the polyisocyanate,
      wherein:
         (i) the physical blowing agent comprises a hydrochlorofluoroolefin that is present in an amount of 5% to 15% by weight, based on total weight of the polyurethane foam-forming composition, and in an amount of at least 90% by weight, based on total weight of physical blowing agent in the blowing agent composition, and
         (ii) the physical blowing agent composition and the water are present in a relative ratio, by weight, of 5:1 to 50:1.

2. The polyurethane foam-forming composition of claim 1, wherein the aromatic amine-initiated polyether polyol has a content of $-C_2H_4O-$ units of less than 10% by weight, based on total weight of the aromatic amine-initiated polyether polyol.

3. The polyurethane foam-forming composition of claim 1, wherein the aromatic amine-initiated polyether polyol has a content of $-C_2H_4O-$ units of less than 2% by weight, based on total weight of the aromatic amine-initiated polyether polyol.

4. The polyurethane foam-forming composition of claim 1, wherein the aromatic amine-initiated polyether polyol is present in an amount of 30 to 60% by weight, based on the total weight of the polyol blend.

5. The polyurethane foam-forming composition of claim 1, wherein the saccharide-initiated polyether polyol has a content of $-C_2H_4O-$ units of less than 40% by weight, based on total weight of the saccharide-initiated polyether polyol.

6. The polyurethane foam-forming composition of claim 4, wherein the saccharide-initiated polyol is present in an amount of 30 to 60% by weight.

7. The polyurethane foam-forming composition of claim 6, wherein the aromatic polyester polyol is present in an amount of 5 to 25% by weight, based upon the total weight of the polyol blend.

8. The polyurethane foam-forming composition of claim 1, wherein the aromatic amine-initiated polyether polyol and the saccharide-initiated polyether polyol are present in a weight ratio of 1:1 to 5:1, the aromatic amine-initiated polyether polyol and the aromatic polyester polyol are present in a weight ratio of 1:1 to 5:1, and the saccharide-initiated polyether polyol and the aromatic polyester polyol are present in a weight ratio of 1:1 to 5:1.

9. The polyurethane foam-forming composition of claim 1, wherein the polyol blend has a content of $-C_2H_4O-$ units of 4 to 6% by weight, based on total weight of the polyurethane foam-forming composition.

10. The polyurethane foam-forming composition of claim 1, wherein the polyol blend does not include a filled polyol.

11. The polyurethane foam-forming composition of claim 1, wherein the sum of the amount of the aromatic amine-initiated polyether polyol, the saccharide-initiated polyether polyol, and the aromatic polyester polyol is at least 90% by weight, based on the total weight of the polyol blend.

12. The polyurethane foam-forming composition of claim 1, wherein the hydrochlorofluoroolefin is present in amount of at least 95% by weight, based on the total weight of the physical blowing agent in the blowing agent composition.

13. The polyurethane foam-forming composition of claim 12, wherein the physical blowing agent composition and the water are present in a relative ratio, by weight, of 5:1 to 20:1.

14. A polyurethane foam produced from the polyurethane foam-forming composition of claim 1.

15. A method of producing a polyurethane foam, comprising reacting, at an isocyanate index of 1.01 to less than 1.15, a polyurethane foam-forming composition comprising a polyol blend, a polyisocyanate, and a blowing agent composition, wherein:
   (a) the polyol blend comprises:
      (1) at least 30% by weight, based on total weight of the polyol blend, of an aromatic amine-initiated polyether polyol having a functionality of at least 2.5 and an OH number of 200 to 600 mg KOH/g;
      (2) at least 30% by weight, based on total weight of the polyol blend, of a saccharide-initiated polyether polyol having a functionality of 4 to 6 and an OH number of 200 to 600 g/KOH gram; and
      (3) 1 to 25% by weight, based on total weight of the polyol blend, of an aromatic polyester polyol having a functionality of 1.5 to 3 and an OH number of 150 to 410 mg KOH/g,
      wherein the polyol blend has a content of $-C_2H_4O-$ units of 3 to 6% by weight, based on the total weight of the polyurethane foam-forming composition; and
   (b) the blowing agent composition comprises:
      (1) a physical blowing agent; and
      (2) water present in an amount of at least 1.70% by weight, based on the total weight of the polyurethane foam-forming composition except for the weight of the polyisocyanate,
      wherein:
         (i) the physical blowing agent comprises a hydrochlorofluoroolefin that is present in an amount of 5% to 15% by weight, based on total weight of the polyurethane foam-forming composition and in an amount of at least 20% by weight, based on total weight of physical blowing agent in the blowing agent composition, and (ii) the physical blowing agent composition and the water are present in a relative ratio, by weight, of 5:1 to 50:1.

16. The method of claim 15, wherein the aromatic amine-initiated polyether polyol has a content of —C₂H₄O— units of less than 2% by weight, based on total weight of the aromatic amine-initiated polyether polyol.

17. The method of claim 15, wherein the aromatic amine-initiated polyether polyol is present in an amount of 30 to 60% by weight, based on the total weight of the polyol blend, the saccharide-initiated polyol is present in an amount of 30 to 60% by weight, and the aromatic polyester polyol is present in an amount of 5 to 25% by weight, based upon the total weight of the polyol blend.

18. The method of claim 15, wherein the sum of the amount of the aromatic amine-initiated polyether polyol, the saccharide-initiated polyether polyol, and the aromatic polyester polyol is at least 90% by weight, based on the total weight of the polyol blend.

19. An isocyanate-reactive composition, comprising:
   (a) polyol blend comprising:
      (1) at least 30% by weight, based on total weight of the polyol blend, of an aromatic amine-initiated polyether polyol having a functionality of at least 2.5 and an OH number of 200 to 600 mg KOH/g;
      (2) at least 30% by weight, based on total weight of the polyol blend, of a saccharide-initiated polyether polyol having a functionality of 4 to 6 and an OH number of 200 to 600 g/KOH gram; and
      (3) 1 to 25% by weight, based on total weight of the polyol blend, of an aromatic polyester polyol having a functionality of 1.5 to 3 and an OH number of 150 to 410 mg KOH/g,
      wherein the polyol blend has a content of —C₂H₄O— units of 5 to 15% by weight, based on the total weight of the isocyanate-reactive composition; and
   (b) a blowing agent composition comprising:
      (1) a physical blowing agent and
      (2) water present in an amount of at least 1.70% by weight, based on the total weight of the isocyanate-reactive composition,
      wherein:
         (i) the physical blowing agent comprises a hydrochlorofluoroolefin that is present in an amount of 10% to 30% by weight, based on total weight of the isocyanate-reactive composition and in an amount of at least 90% by weight, based on total weight of physical blowing agent in the blowing agent composition, and
         (ii) the physical blowing agent composition and the water are present in a relative ratio, by weight, of 5:1 to 50:1.

20. The isocyanate-reactive composition of claim 19, wherein the aromatic amine-initiated polyether polyol is present in an amount of 30 to 60% by weight, based on the total weight of the polyol blend, the saccharide-initiated polyol is present in an amount of 30 to 60% by weight, the aromatic polyester polyol is present in an amount of 5 to 25% by weight, based upon the total weight of the polyol blend, and the sum of the amount of the aromatic amine-initiated polyether polyol, the saccharide-initiated polyether polyol, and the aromatic polyester polyol is at least 90% by weight, based on the total weight of the polyol blend.

21. The polyurethane foam-forming composition of claim 1, wherein the saccharide-initiated polyether polyol is a reaction product of an H-functional starter comprising saccharide with alkylene oxide, wherein:
   (i) the saccharide comprises sucrose present in an amount of more than 50% by weight, based on total weight of the H-functional starter used to produce the saccharide-initiated polyether polyol and wherein the H-functional starter further comprises water, propylene glycol, ethylene glycol, ethanol amine, diethylene glycol, or a mixture of any two or more thereof, and
   (ii) the alkylene oxide used to produce the saccharide-initiated polyether polyol comprises propylene oxide and ethylene oxide, wherein propylene oxide is used in an amount of more than 50% by weight, based on total weight of alkylene oxide used to prepare the saccharide-initiated polyether polyol.

22. The method of claim 15, wherein the saccharide-initiated polyether polyol is a reaction product of an H-functional starter comprising saccharide with alkylene oxide, wherein:
   (i) the saccharide comprises sucrose present in an amount of more than 50% by weight, based on total weight of the H-functional starter used to produce the saccharide-initiated polyether polyol and wherein the H-functional starter further comprises water, propylene glycol, ethylene glycol, ethanol amine, diethylene glycol, or a mixture of any two or more thereof, and
   (ii) the alkylene oxide used to produce the saccharide-initiated polyether polyol comprises propylene oxide and ethylene oxide, wherein propylene oxide is used in an amount of more than 50% by weight, based on total weight of alkylene oxide used to prepare the saccharide-initiated polyether polyol.

23. The isocyanate-reactive composition of claim 19, wherein the saccharide-initiated polyether polyol is a reaction product of an H-functional starter comprising saccharide with alkylene oxide, wherein:
   (i) the saccharide comprises sucrose present in an amount of more than 50% by weight, based on total weight of the H-functional starter used to produce the saccharide-initiated polyether polyol and wherein the H-functional starter further comprises water, propylene glycol, ethylene glycol, ethanol amine, diethylene glycol, or a mixture of any two or more thereof, and
   (ii) the alkylene oxide used to produce the saccharide-initiated polyether polyol comprises propylene oxide and ethylene oxide, wherein propylene oxide is used in an amount of more than 50% by weight, based on total weight of alkylene oxide used to prepare the saccharide-initiated polyether polyol.

* * * * *

UNITED STATES PATENT AND TRADEMARK OFFICE
CERTIFICATE OF CORRECTION

PATENT NO.         : 11,767,407 B1
APPLICATION NO.    : 17/726166
DATED              : September 26, 2023
INVENTOR(S)        : Brandon Parks Page 1 of 1

It is certified that error appears in the above-identified patent and that said Letters Patent is hereby corrected as shown below:

In the Claims

In Column 28, Line 65, please replace the number "20" with "90".

Signed and Sealed this
Thirty-first Day of October, 2023

*Katherine Kelly Vidal*

Katherine Kelly Vidal
*Director of the United States Patent and Trademark Office*